United States Patent
Holmes et al.

(10) Patent No.: US 7,389,286 B2
(45) Date of Patent: Jun. 17, 2008

(54) ENHANCED TRADE COMPLIANCE SYSTEM: AUDIT PROCESSING, PAYMENT BALANCING PROCESS AND AMENDMENT PROCESSING

(75) Inventors: Frederic Holmes, Lakewood, CA (US); Tom Potts, Laguna Niguel, CA (US); Anthony Uy, Torrance, CA (US); Laurie Peach, Laguna Hills, CA (US); Matt Halterman, Corona, CA (US); Mark Swirt, Sunland, CA (US)

(73) Assignee: Honda Motor Co., Ltd., Tokyo (JP)

( * ) Notice: Subject to any disclaimer, the term of this patent is extended or adjusted under 35 U.S.C. 154(b) by 457 days.

(21) Appl. No.: 11/039,003

(22) Filed: Jan. 19, 2005

(65) Prior Publication Data
US 2006/0015418 A1    Jan. 19, 2006

Related U.S. Application Data

(63) Continuation-in-part of application No. 10/745,956, filed on Dec. 24, 2003, application No. 11/039,003, which is a continuation-in-part of application No. 10/779,039, filed on Feb. 13, 2004, which is a continuation of application No. 10/745,956, filed on Dec. 24, 2003, application No. 11/039,003, which is a continuation-in-part of application No. 10/790,513, filed on Mar. 1, 2004, which is a continuation of application No. 10/745,956, filed on Dec. 24, 2003, application No. 11/039,003, which is a continuation-in-part of application No. 10/854,473, filed on May 26, 2004, which is a continuation of application No. 10/745,956, filed on Dec. 24, 2003.

(60) Provisional application No. 60/606,333, filed on Sep. 1, 2004, provisional application No. 60/545,006, filed on Feb. 17, 2004, provisional application No. 60/539,486, filed on Jan. 27, 2004, provisional application No. 60/484,884, filed on Jul. 2, 2003, provisional application No. 60/436,679, filed on Dec. 27, 2002.

(51) Int. Cl.
*G06F 7/00* (2006.01)

(52) U.S. Cl. ............................................. 707/3; 705/30

(58) Field of Classification Search ................ 707/100, 707/101, 102, 1–10; 705/26, 30, 40
See application file for complete search history.

(56) References Cited

U.S. PATENT DOCUMENTS 4,719,571 A    1/1988    Rissanen et al.

(Continued)

OTHER PUBLICATIONS

U.S. Customs Publication entitled "Quantity Pre-Assessment Survey" (Oct. 2002).

*Primary Examiner*—Wilson Lee
(74) *Attorney, Agent, or Firm*—McDermott Will & Emery LLP

(57) ABSTRACT

Methods and systems for auditing invoice and payment records are disclosed. A computer system may receive a plurality of invoices and payment records, compare one of the invoices to a matching one of the payment records to identify a discrepancy between the invoice and the payment record, calculate an error value as a function of the identified discrepancy, determine that the calculated error value exceeds a tolerance value, and generate an reporting the identified discrepancy. Methods and systems for balancing invoices and payment records are also disclosed. A computer system may compare dates and payment amounts of the invoices to dates and payment amounts of the payment records, and identify matches between the two. The computer system may then display lists of unmatched invoices and payment records for a user to manually examine.

6 Claims, 28 Drawing Sheets

| | TCS - Payment Balancing | | | | | |
|---|---|---|---|---|---|---|
| | Invoice ID | Date | Amount | Invoice ID | Date | Amount |
| | XXXX-XX-X | 3/31/04 | $2355 | XXXX-XX-X | 3/30/04 | $2355 |
| | XXXX-XX-X | 3/31/04 | $6815 | XXXX-XX-X | 3/31/04 | $8815 |

U.S. PATENT DOCUMENTS

| | | |
|---|---|---|
| 4,945,475 A | 7/1990 | Bruffey et al. |
| 4,970,655 A | 11/1990 | Winn et al. |
| 5,201,047 A | 4/1993 | Maki et al. |
| 5,694,524 A | 12/1997 | Evans |
| 5,940,821 A | 8/1999 | Wical |
| 5,968,110 A | 10/1999 | Westrope |
| 6,067,549 A | 5/2000 | Smalley et al. |
| 6,076,064 A | 6/2000 | Rose, Jr. |
| 6,182,058 B1 | 1/2001 | Kohavi |
| 6,256,640 B1 | 7/2001 | Smalley et al. |
| 6,278,464 B1 | 8/2001 | Kohavi et al. |
| 6,571,227 B1 | 5/2003 | Agrafiotis et al. |
| 2002/0013721 A1 | 1/2002 | Dabbiere et al. |
| 2002/0049660 A1 | 4/2002 | Obrador et al. |
| 2002/0069095 A1 | 6/2002 | Nishio et al. |
| 2002/0095355 A1 | 7/2002 | Walker et al. |
| 2002/0120533 A1 | 8/2002 | Wiesenmaier |
| 2002/0120561 A1 | 8/2002 | Chin et al. |
| 2003/0065725 A1 | 4/2003 | Delmer et al. |
| 2003/0065726 A1 | 4/2003 | Wells et al. |
| 2003/0065949 A1 | 4/2003 | Le et al. |
| 2003/0069831 A1 | 4/2003 | Le et al. |
| 2003/0078885 A1* | 4/2003 | Felton et al. ............... 705/40 |
| 2003/0093358 A1 | 5/2003 | Liao et al. |
| 2003/0105704 A1 | 6/2003 | Sundel |
| 2003/0115072 A1 | 6/2003 | Manucha et al. |
| 2003/0163447 A1 | 8/2003 | Sandman |
| 2003/0191652 A1 | 10/2003 | Li et al. |
| 2003/0195815 A1* | 10/2003 | Li et al. .................... 705/26 |
| 2003/0212617 A1* | 11/2003 | Stone et al. ............... 705/30 |
| 2003/0220843 A1* | 11/2003 | Lam et al. .................. 705/26 |
| 2004/0172360 A1* | 9/2004 | Mabrey et al. ............. 705/40 |

* cited by examiner

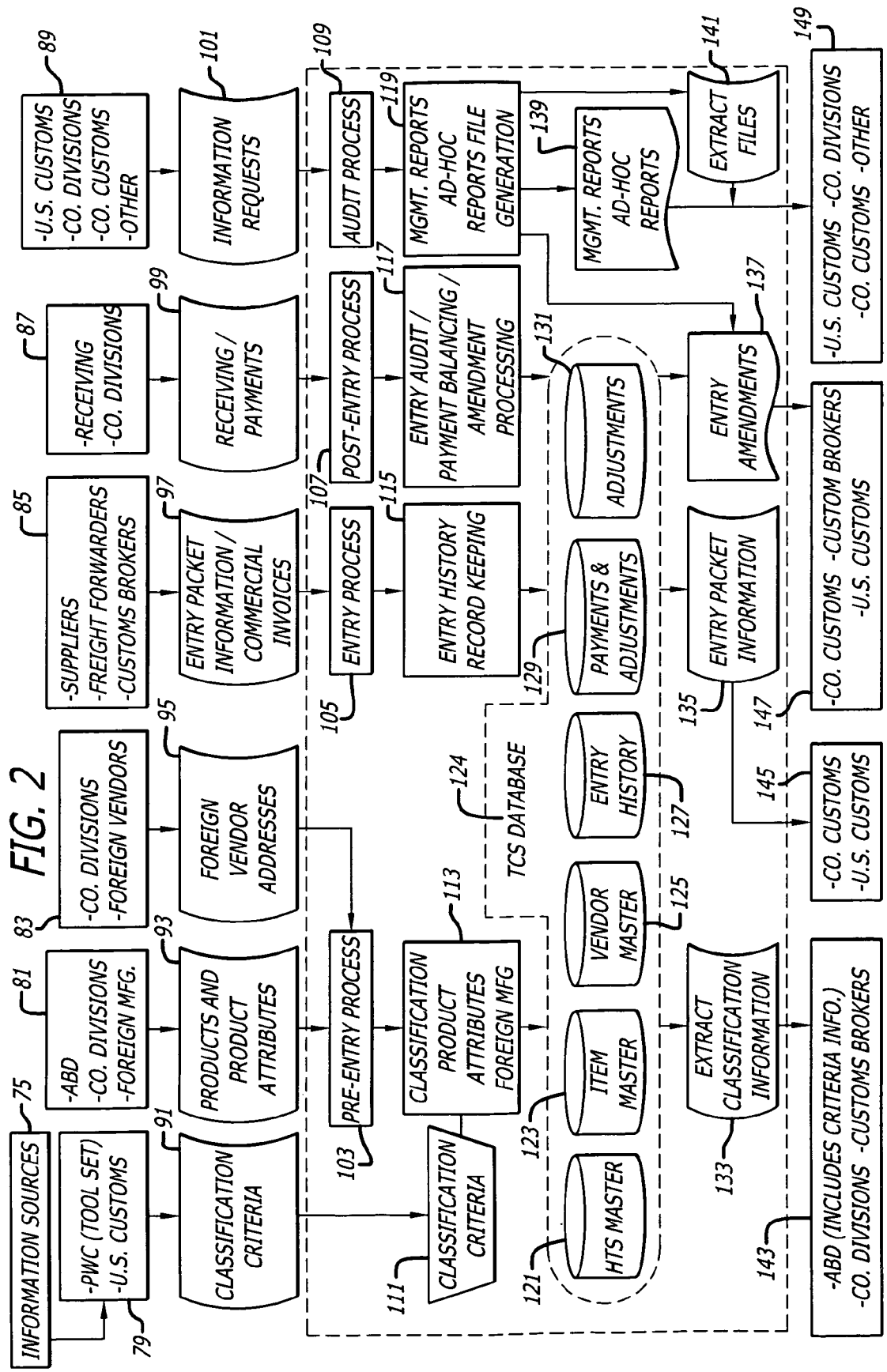

Trade Compliance System - Home Page

Address: http://tcs/classification/ItemInquireG1.asp

Home | Sys Admin | Classification | Entry Hist | Amendments | Audits | CAIRS | Log Off

Classification > Item Master

FC/CG Tables | HTS Maintenance | MID/COO | Vendor Master

⊙ Back to Item Search  ⊙ Mass Update  ⊙ Inquire

Item Search

Item ID *: 11200     OR     HTS#*:          Invoice Description:          Div: N     Classify Status: Classified

| Item ID | Div | Invoice Desc | Model | HTS# | Commodity | Status |
|---|---|---|---|---|---|---|
| 11200-KW8-902 | N | CRANKCASE, L. | NX125 89 | 8483.90.8090 | | CLASSIFIED |
| 11200-PWA-020 | N | Pan-Oil Engine | | 8409.91.5080 | | CLASSIFIED |
| 11200-RDA-A00 | N | Pan-Oil Engine | 2004/ACURA TL | 8409.91.5080 | | CLASSIFIED |
| 11200-VM3-000 | N | | ATC200M 84 | 8708.99.6700 | | CLASSIFIED |

⊙ Back to Item Search  ⊙ Mass Update  ⊙ Inquire

FC/CG Tables | HTS Maintenance | MID/COO | Vendor Master

Home | Sys Admin | Classification | Entry Hist | Amendments | Audits | CAIRS | Log Off

| INTERNAL CLASSIFICATION SYTEM | | HTS CODE |
|---|---|---|
| FUNCTION 1 | PART A1 | CODE A1 |
| | PART A2 | CODE A2 |
| | PART A3 | CODE A3 |
| FUNCTION 2 | PART B1 | CODE A4 |
| | PART B2 | CODE A5 |
| FUNCTION 3 | PART C1 | CODE A6 |
| | PART C2 | CODE A7 |
| FUNCTION 4 | PART D1 | CODE A8 |

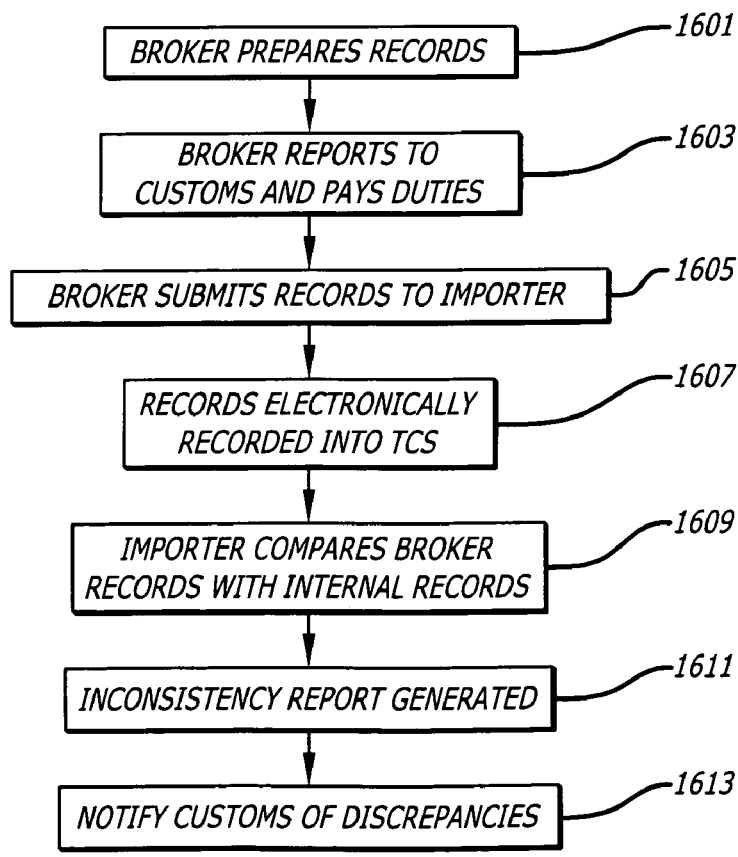

FIG. 16

- 1601 BROKER PREPARES RECORDS
- 1603 BROKER REPORTS TO CUSTOMS AND PAYS DUTIES
- 1605 BROKER SUBMITS RECORDS TO IMPORTER
- 1607 RECORDS ELECTRONICALLY RECORDED INTO TCS
- 1609 IMPORTER COMPARES BROKER RECORDS WITH INTERNAL RECORDS
- 1611 INCONSISTENCY REPORT GENERATED
- 1613 NOTIFY CUSTOMS OF DISCREPANCIES

FIG. 18

TCS - Entry History - HTS Detail

File  Edit  View  Create  Actions  Attachment  Window  Help

Address: http://tcs-dev/dev98/entryhistory/eh_headerSummary.asp?hidProd=HTS    Go    Links >>

Classification > By HTS > Detail

By Header/CI | By HTS | By Product | By Event

⊕ View Audit Results                ⊕ Add line Item

| | | | | |
|---|---|---|---|---|
| Entry No: 112-1862366-7 | Entry Type: 01 | | | Version # 1 of 1 |
| Entry Date: 01/27/2003 | Broker Invoice: 0000018623667-001 | | | Entry Port: 0901 |
| Export Country: CA | | | | Port of Unlading: 0901 |
| Invoice Seq: 001 | Invoice No: 019535 | Currency Rate: | | Seller MID: XOHONCAN715SCA |
| Vendor: 113HONDA | | Invoice Term: | | Entered Value: 126,832.00 |
| Division: A - Honda | | | | Invoice Amount: 126,832.00 |

Displaying Summary Line 1 - 5 of 10    Next ⊕

| Sum-Line#: 001 | Visa Category#: | Visa Control#: | Quota Reqd: | COO: XO | SPI: CA |
|---|---|---|---|---|---|

HTS-1    8703.23.0046                    HTS-2
Desc: <=4CYL, OTH,>2.8M3<=3.1M3                    Desc:

Qty-1: 1.00 NO    Qty-2:            0.00            Gross Weight(Kg):    0

OGA Flags
FCC  EPA3520
FDA  EPA3521                    Anti-Dumping (ADD)
DOT  HAZMAT    Case #:    Bond:        Duty Rate (%):    0.0000    Duty:    0.00
TSCA FMVSS
OSHA NTHSA                    Countervailing (CVD)
         Case #:    Bond:        Duty Rate (%):    0.0000    Duty:    0.00
                    0.00000000

HMF:  0.00    MPF:  0.00            Entered Duty:        0.00
⊕ Product Detail    Duty Rate (%):    0.00000000            Entered Value:  12,112.00

Start                                Local Intranet    11:33 AM

TCS - Audit - Exceptions By Audit

File Edit View Create Actions Attachment Window Help

Address: http://tcs/audit/audit_EntryResults.asp

Home | Sys Admin | Classification | Entry Hist | Amendments | Audits | CAIRS | Log Off

Audits > Entry Audit Results

Audit Exceptions | Pmt Balancing Results | Pmt Balancing Exceptions | Vendor Payment

Enter Selection Criteria

Note: Enter Complete Entry No.

Entry No.: 112-9866132-2    ⓘ Inquire

Entry No.: 112-9866132-2    Latest Version #: 1    Entry Date: 01/27/2003    Entered Value: 106,232.51

Audits Results Summary

| Group | Version | | Fall | | Pass | | Unaudited | |
|---|---|---|---|---|---|---|---|---|
| | Audit Time | | | | | | | |
| HEADER | 1 | ENTRY Count: | 0 | 0% | 1 | 100% | 0 | 0% |
| 04/22/2003 | 17:22:45 | Value: | | 0% | 106,232.51 | 100% | | 0% |
| INVOICE | 1 | INVOICE Count: | 0 | 0% | 1 | 100% | 0 | 0% |
| 04/22/2003 | 17:22:45 | Value: | | 0% | 106,232.51 | 100% | | 0% |
| PYMT BAL | 1 | INVOICE Count: | 0 | 0% | 1 | 100% | 0 | 0% |
| 05/09/2003 | 11:38:25 | Value: | | 0% | 106,232.51 | 100% | | 0% |
| PRODUCT | 1 | LINE ITEM Count: | 14 | 3% | 424 | 97% | 0 | 0% |
| 05/17/2003 | 04:14:46 | Value: | 1,074.35 | 1% | 105,158.16 | 99% | | 0% |

FIG. 21

TCS - Audit - Exceptions By Audit

File  Edit  View  Create  Actions  Attachment  Window  Help

Address: http://tcs/audit/audit_EntryResults.asp

Audit Exceptions

18 Exceptions

| Group | Audit | Message | Failure Info | Severity |
|---|---|---|---|---|
| CI-#: 001 PRODUCT | Invoice: ATS2923 Country of Origin Audit | Line-#: 000073 COO Not On Master Enter=JP MSTR= | Item ID: 83712-MAL-A002B | Error |
| CI-#: 001 PRODUCT | Invoice: ATS2923 Primary HTS Audit | Line-#: 000283 Primary HTS Code Incorrect Enter=8409.91.9290 Master=8708.92.5000 | Item ID: 18320-HW1-680 | Restricted |
| CI-#: 001 PRODUCT | Invoice: ATS2923 Duty Calculation Audit | Line-#: 000317 Rptg Factor Reqd for Duty Calc COMPUTATION CODE=1 | Item ID: 90432-HA2-670 | Restricted |

ⓘ Change Criteria   ⓘ View Audit Exceptions by Audit Group

Local Intranet

TCS - Audit - Exceptions By Audit

File  Edit  View  Create  Actions  Attachment  Window  Help

Address: http://tcs/audit/audit_EntryResults.asp

| CI-#: 001 PRODUCT | Invoice: ATS2923 Primary HTS Audit | Line-#: 000364 Primary HTS Code Incorrect Enter=7318.15.8080 Master=7318.15.8045 | Item ID: 90114-MCJ-000 | Restricted |
|---|---|---|---|---|
| CI-#: 001 PRODUCT | Invoice: ATS2923 Country of Origin Audit | Line-#: 000430 COO Not On Master Enter=KR MSTR=JP | Item ID: 17910-HN5-670 | Error |

Enter=4015.93.1010 Master=8409.91.5080

ⓘ View Audit Exceptions by Audit Group For this Entry

Local Intranet

Start                                                                                11:33 AM

FIG. 22

TCS - Audit - Exceptions By Audit

Address: http://tcs/audit/audit_ExceptionAudit.asp?hidParent=510&hidAction=BACK&hidView="

Audit Exceptions By Audit Group

Page 1 of 2                                                                                               1  2

| Entry No. | Entry Date | Ver# | CI-# | Commercial Invoice | Line-# | Item ID |
|---|---|---|---|---|---|---|
| Message | | | | Failure Info | | Severity |
| Group: PRODUCT | | | | Audit: Country of Origin Audit | | 2 Excps |
| 112-9866132-2 COO Not On Master | 01/27/2003 | 1 Enter=JP MSTR= | 001 | ATS2923 | 000073 | 83712-MAL-A00ZB Error |
| 112-9866132-2 COO Not On Master | 01/27/2003 | 1 Enter=KR MSTR=JP | 001 | ATS2923 | 000430 | 17910-HN5-670 Error |
| Group: PRODUCT | | | | Audit: Primary HTS Audit | | 8 Excps |
| 112-9866132-2 Primary HTS Code Incorrect | 01/27/2003 | 1 Enter=8409.91.9290 Master=8708.92.5000 | 001 | ATS2923 | 000283 | 18320-HW1-680 Restricted |
| 112-9866132-2 Primary HTS Code Incorrect | 01/27/2003 | 1 Enter=8484.10.0000 Master=3926.90.4590 | 001 | ATS2923 | 000329 | 91205-POX-005 Restricted |
| 112-9866132-2 Primary HTS Code Incorrect | 01/27/2003 | 1 Enter=7318.15.2060 Master=7318.15.8065 | 001 | ATS2923 | 000340 | 90104-KAB-000 Restricted |
| 112-9866132-2 Primary HTS Code Incorrect | 01/27/2003 | 1 Enter=7318.15.2060 Master=7318.15.8065 | 001 | ATS2923 | 000341 | 90133-MB0-000 Restricted |
| 112-9866132-2 Primary HTS Code Incorrect | 01/27/2003 | 1 Enter=4016.93.1050 Master=3926.90.4590 | 001 | ATS2923 | 000350 | 72435-SP0-003 Restricted |
| 112-9866132-2 Primary HTS Code Incorrect | 01/27/2003 | 1 Enter=4016.93.1050 Master=4016.10.0000 | 001 | ATS2923 | 000351 | 72935-SP0-003 Restricted |
| 112-9866132-2 Primary HTS Code Incorrect | 01/27/2003 | 1 Enter=4016.93.1010 Master=8409.91.5080 | 001 | ATS2923 | 000360 | 91301-PM7-003 Restricted |
| 112-9866132-2 Primary HTS Code Incorrect | 01/27/2003 | 1 Enter=7318.15.8080 Master=7318.15.8045 | 001 | ATS2923 | 000364 | 90114-MCJ-000 Restricted |

FIG. 23

| TCS - Payment Balancing | | | | | |
|---|---|---|---|---|---|
| Invoice ID | Date | Amount | Invoice ID | Date | Amount |
| XXXX-XX-X | 3/31/04 | $2355 | XXXX-XX-X | 3/30/04 | $2355 |
| XXXX-XX-X | 3/31/04 | $6815 | XXXX-XX-X | 3/31/04 | $8815 |

Fig. 31

ENHANCED TRADE COMPLIANCE SYSTEM: AUDIT PROCESSING, PAYMENT BALANCING PROCESS AND AMENDMENT PROCESSING

CROSS REFERENCE TO RELATED APPLICATIONS

This application is a continuation in part of and claims priority to U.S. patent application Ser. No. 10/745,956, entitled "Harmonized Tariff Schedule Classification Using Decision Tree Database," filed Dec. 24, 2003, which claims priority to U.S. Provisional Patent Application entitled "Trade Compliance System," Ser. No. 60/436,679, filed Dec. 27, 2002. This application is also a continuation in part of and claims priority to U.S. patent application Ser. No. 10/779,039, filed Feb. 13, 2004, entitled "Two-Pass Harmonized Tariff Schedule Classification," which is a continuation of application Ser. No. 10/745,956 filed Dec. 24, 2003. This application is also a continuation in part of and claims priority to U.S. patent application Ser. No. 10/790,513, filed Mar. 1, 2004, entitled "Harmonized Tariff Schedule Classification Using Entry Data," which is a continuation of application Ser. No. 10/745,956 filed Dec. 24, 2003. This application is also a continuation in part of and claims priority to U.S. patent application Ser. No. 10/854,473, filed May 26, 2004, entitled "Online Screen Navigation and Linkage," which is a continuation of application Ser. No. 10/745,956, filed Dec. 24, 2003, and which claims priority to U.S. Provisional Patent Application entitled, "Harmonized Tariff Schedule Classification Using Decision Tree Database," Application Ser. No. 60/484,884, filed Jul. 2, 2003.

This application also claims priority to the following U.S. provisional applications: Enhanced Trade Compliance System: Audit Processing, Payment Balancing Process and Amendment Processing, Ser. No. 60/539,486 filed Jan. 27, 2004; Enhanced Trade Compliance System: Advanced Shipment Notice, Ser. No. 60/545,006, filed Feb. 17, 2004; Enhanced Trade Compliance System: Mass Amendment Process, Ser. No. 60/606,333 filed Sep. 1, 2004. This application is also related to the following U.S. provisional applications: Two-Pass Harmonized Tariff Schedule Classification System, Ser. No. 60/485,025, filed Jul. 2, 2003; Harmonized Tariff Schedule Classification Using Entry Data, Ser. No. 60/484,845, filed Jul. 2, 2003; Customs Duty Audit Using Post Entry Data, Ser. No. 60/484,844, filed Jul. 2, 2003; Linking Customs Entry Packets To Electronic Entries, Ser. No. 60/484,843, filed Jul. 2, 2003; Electronic Reimbursement Of Customs Broker, Ser. No. 60/484,835, filed Jul. 02, 2003; and Trade Compliance System Online Screen Navigation And Linkage, Ser. No. 60/487,858, filed Jul. 15, 2003.

The content of all of these regular and provisional applications is incorporated herein by reference as though fully set forth herein.

BACKGROUND

1. Field of the Disclosure

The disclosures herein relate generally to processes for ensuring an importer's compliance with domestic customs requirements. More specifically, the present disclosures relate to systems and methods for correcting erroneous information reported to customs agents, as well as the effects of such erroneous reports, after the imported goods to which the reported information refer are received by the importer.

2. Description of Related Art

When a U.S. company imports goods from foreign sources, it may be subject to numerous U.S. Customs regulations. One such set of requirements is based upon a complex classification system promulgated by U.S. Customs, known as the Harmonized Tariff Schedule ("HTS") code. Within this system, U.S. Customs classifies types of products using 10-digit HTS codes. These codes may be used, for example, to determine the applicable tariff rates on different types of products imported into the U.S. Importers must therefore correctly classify each imported product under the appropriate HTS code, so that the proper duty amounts may be calculated.

A customs broker is an intermediary between an importer and U.S. Customs. The broker determines the amount of duty owed on imported goods and prepares and submits paperwork and duty payment to U.S. Customs on behalf of the importer. Foreign suppliers send invoices and shipping documents with their shipment of imported goods, and these documents are generally required by customs brokers for the purpose of calculating the duty and preparing the Customs paperwork submissions. The broker then submits a report to the importer, which includes information about the Customs filings and the amount of duty paid.

Sometimes, a customs broker will make mistakes when estimating the amount of duty owed on the goods in a shipment. Sometimes, a duty may be miscalculated because of mistakes in the invoices and shipping documents. When such mistakes are of great enough magnitude to warrant concern, the mistakes may be corrected, and an official amendment may then be generated and filed with U.S. Customs. Detecting such mistakes can be a cumbersome process, and keeping track of standards for detecting when mistakes are of great enough magnitude to warrant corrections and amendments, whether such standards are initiated by U.S. Customs or by the importer, can be particularly difficult.

In addition to customs broker reports, for each shipment of imported goods an importer also receives information directly from the foreign suppliers. Information from the suppliers may include billing invoices, and are typically the same as the shipping invoices. However, sometimes billing invoices are prepared by the suppliers at a different time or in a different location than the shipping invoices were prepared, which can result in discrepancies between the two types of invoices. Examples of common discrepancies are inconsistent dates, unit numbers, and dollar amounts. Such inconsistencies make it difficult for an importer to balance its billing invoices against the shipping invoices and documents used by the customs broker, because it is difficult to match documents relating to a single shipment when they are inconsistently labeled.

Because of the difficulties described above, and other complexities involved in the importation, classification and trade compliance process, there is not currently a thorough, convenient or efficient way to manage the various types of import-related data such that they can be centrally accessed for trade compliance processing. Rather, each type of data is typically handled by a different person or within a different section of a large multi-division importer. This causes trade compliance processing within a multi-division importing company to be a disjointed and time-consuming procedure.

SUMMARY OF THE PRESENT DISCLOSURES

In view of the various problems discussed above, there is a need for an improved mechanism for tracking and processing trade compliance data. The forms created by customs brokers for each importation, including a U.S. Customs 7501 form, a commercial invoice, and a shipment manifest, may be forwarded from a broker to an importer in addition to being presented to U.S. customs. These forms may collectively form an "entry" in the importer's trade compliance management system. There is a need to provide convenient computerized method for associating and comparing these entry documents and coordinating documents provided by the shipper of the goods, such that the two sets of documents may be audited, amended and balanced when applicable.

In one aspect of the present teachings, a method of auditing invoice and shipping records includes receiving a plurality of invoices in a computer system, each invoice referring to a shipment, receiving a plurality of payment records in the computer system, each payment record referring to a shipment, matching one of the invoices to one of the payment records, wherein the matched invoice and payment record refer to the same shipment, comparing the matched invoice and payment record to identify a discrepancy between them, calculating an error value as a function of the identified discrepancy, determining that the calculated error value exceeds a predetermined tolerance value, and generating an output from the computer system in response to determining that the calculated error value exceeds the predetermined tolerance value, the output reporting the identified discrepancy.

In another aspect of the present teachings, a method of auditing invoice and payment records includes receiving a plurality of invoices in a computer system, each invoice referring to a shipment, receiving a plurality of payment records in the computer system, each payment record referring to a shipment, identifying a plurality of matched sets of invoices and payment records, wherein each matched set includes an invoice and payment record referring to the same shipment, identifying, for each one of the plurality of matched sets, a discrepancy between the invoice and payment record in that matched set, calculating an error value for each one of the plurality of matched sets as a function of the identified discrepancy, determining that each calculated error value exceeds a predetermined tolerance value, identifying a pattern in the identified discrepancies, and generating an output from the computer system reporting the identified pattern.

In another aspect of the present teachings, a method of balancing payment records and invoices includes receiving a plurality of invoices in a computer system, each invoice referring to a shipment, receiving a plurality of payment records in the computer system, each payment record referring to a shipment, identifying a plurality of unmatched invoices, each having no matching payment record in the plurality of payment records, identifying a plurality of unmatched payment records, each having no matching invoice in the plurality of invoices, generating a first list including the unmatched invoices and a second list including the unmatched payment records, and displaying the first and second lists together.

In yet another aspect of the present teachings, computer-readable media embodies a program of instructions executable by a computer to perform a method of auditing invoice and payment records. The method includes receiving a plurality of invoices in a computer system, each invoice referring to a shipment, receiving a plurality of payment records in the computer system, each payment record referring to a shipment, matching one of the invoices to one of the payment records, wherein the matched invoice and payment record refer to the same shipment, comparing the matched invoice and payment record to identify a discrepancy between them, calculating an error value as a function of the identified discrepancy, determining that the calculated error value exceeds a predetermined tolerance value, and generating an output from the computer system in response to determining that the calculated error value exceeds the predetermined tolerance value, the output reporting the identified discrepancy.

In a further aspect of the present teachings, computer-readable media embodies a program of instructions executable by a computer to perform a method of auditing invoice and payment records. The method includes receiving a plurality of invoices in a computer system, each invoice referring to a shipment, receiving a plurality of payment records in the computer system, each payment record referring to a shipment, identifying a plurality of matched sets of invoices and payment records, wherein each matched set includes an invoice and payment record referring to the same shipment, identifying, for each one of the plurality of matched sets, a discrepancy between the invoice and payment record in that matched set, calculating an error value for each one of the plurality of matched sets as a function of the identified discrepancy, determining that each calculated error value exceeds a predetermined tolerance value, identifying a pattern in the identified discrepancies, and generating an output from the computer system reporting the identified pattern.

In another aspect of the present teachings, computer-readable media embodying a program of instructions executable by a computer to perform a method of balancing invoice and payment records. The method includes receiving a plurality of invoices in a computer system, each invoice referring to a shipment, receiving a plurality of payment records in the computer system, each payment record referring to a shipment, identifying a plurality of unmatched invoices, each having no matching payment record in the plurality of payment records, identifying a plurality of unmatched payment records, each having no matching invoice in the plurality of invoices, generating a first list including the unmatched invoices and a second list including the unmatched payment records, and displaying the first and second lists together.

In yet another aspect of the present teachings, a system for auditing invoice and payment records includes an input configured to receive a plurality of invoices and a plurality of payment records, each invoice referring to a shipment and each payment record referring to a shipment, a processor configured to match one of the invoices to one of the payment records wherein the matched invoice and payment record refer to the same shipment, compare the matched invoice and payment record to identify a discrepancy between them, calculate an error value as a function of the identified discrepancy, and determine that the calculated error value exceeds a predetermined tolerance value and generate an output in response to determining that the calculated error value exceeds the predetermined tolerance value, the output reporting the identified discrepancy, and a display device configured to display the generated output.

In a further aspect of the present teachings, a system for auditing invoice and payment records includes an input configured to receive a plurality of invoices and a plurality of payment records, each invoice referring to a shipment and each payment record referring to a shipment, a processor configured to identify a plurality of matched sets of invoices and payment records wherein each matched set includes an invoice and payment record referring to the same shipment, identify a discrepancy between the invoice and payment record for each one of the plurality of matched sets, calculate an error value for each one of the plurality of matched sets as a function of the identified discrepancy, determine that each calculated error value exceeds a predetermined tolerance value, and identify a pattern in the identified discrepancies, and a display device configured to display an output reporting the identified pattern.

In yet a further aspect of the present teachings, a system for balancing invoice and payment records includes an input configured to receive a plurality of invoices and a plurality of payment records, each invoice referring to a shipment and each payment record referring to a shipment, a processor configured to identify a plurality of unmatched invoices each having no matching payment record in the plurality of payment records, identify a plurality of unmatched payment records each having no matching invoice in the plurality of invoices, and generate a first list including the unmatched invoices and a second list including the unmatched payment records, and a display device configured to display the first and second lists together.

It is understood that other embodiments of the present disclosures will become readily apparent to those skilled in the art from the following detailed description, wherein it is shown and described only exemplary embodiments of the present disclosures by way of illustration. As will be realized, the teachings herein are capable of other and different embodiments and its several details are capable of modification in various other respects, all without departing from the spirit and scope of the present disclosures. Accordingly, the drawings and detailed description are to be regarded as illustrative in nature and not as restrictive.

BRIEF DESCRIPTION OF THE DRAWINGS

Aspects of the present disclosures are illustrated by way of example, and not by way of limitation, in the accompanying drawings, wherein:

FIG. 2 is a flow diagram of a Trade Compliance System ("TCS") in accordance with an embodiment of the present disclosures;

FIG. 9 is another screen for accessing an Item Master of the TCS in accordance with an embodiment of the present disclosures;

FIG. 11 is another screen for accessing HTS codes in an Item Master of the TCS in accordance with an embodiment of the present disclosures;

FIG. 14 is an HTS code classification map in accordance with an embodiment of the present disclosures;

FIG. 16 is a flowchart of a procedure for comparing broker classifications with entry data in accordance with an embodiment of the present disclosures;

FIG. 18 is another screen of the TCS for accessing HTS codes and other product attributes in accordance with an embodiment of the present disclosures;

FIG. 21 is another screen of the TCS for accessing entry audit results in accordance with an embodiment of the present disclosures;

FIG. 22 is another screen of the TCS for accessing audit exceptions in accordance with an embodiment of the present disclosures;

FIG. 23 is another screen of the TCS for accessing audit exceptions by audit group in accordance with an embodiment of the present disclosures;

FIG. 31 is a screen illustrating the post-entry payment balancing capabilities of the TCS in accordance with an embodiment of the present disclosures.

DETAILED DESCRIPTION OF ILLUSTRATIVE EMBODIMENTS

Figure 1:
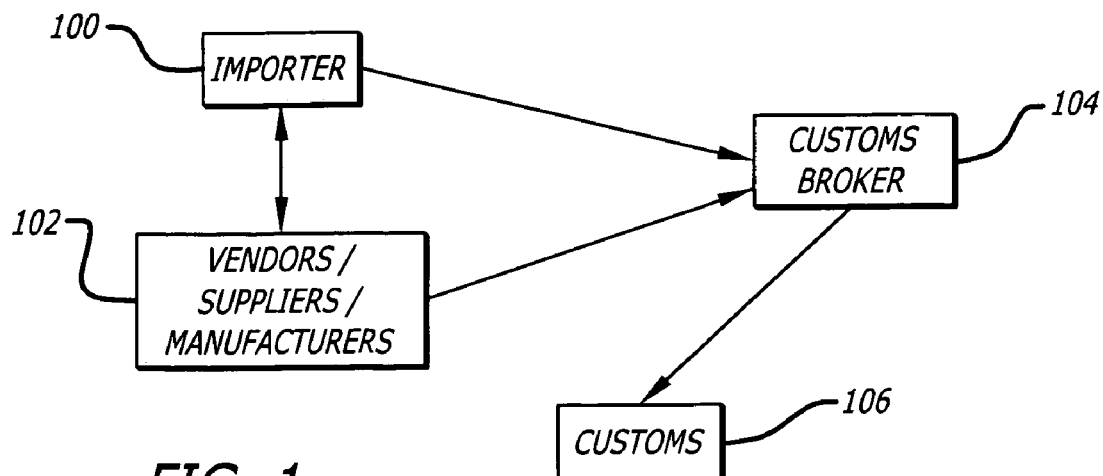
FIG. 1 is a block diagram of entities involved in the customs importation process.

The detailed description set forth below in connection with the appended drawings is intended as a description of various embodiments of the present disclosures and is not intended to represent the only embodiments in which the teachings herein may be practiced. Each embodiment described in this disclosure is provided merely as an example or illustration of the present disclosures, and should not necessarily be construed as preferred or advantageous over other embodiments. The detailed description includes specific details for the purpose of providing a thorough understanding of the teachings herein. However, it will be apparent to those skilled in the art that the teachings may be practiced without these specific details. In some instances, well-known structures and devices are shown in block diagram form in order to avoid obscuring the concepts of the present disclosures.

All goods entering the United States are usually categorized by type of product, in accordance with the guidelines set forth in the Harmonized Tariff Schedule. In ths process, called classification, the importer may assign an HTS code to every product included in imported merchandise. Classification of an item may be completed prior to shipment to the United States, and may also be required by law to be complete by time of entry.

In addition to determining how much duty U.S. Customs collects, classification ensures that importing companies maintain complete and accurate records of all of their imports, including what the products are, where they were made, and what they are made of. Classification may also determine, for example, admissibility of merchandise, application of anti-dumping or countervailing duties, requirements for other governmental agencies, and the Census Bureau of Statistics, and whether products may be eligible for reduced duty under special trade programs. As such, under U.S. Customs' guidelines, importing companies may be responsible for utilizing all available resources to determine correct classification. In addition, companies may be prepared to provide a legitimate rationale for all HTS assignments at the time of classification, and offer proof of consistency in assigning HTS codes for like components.

Classification, however, is only one phase of the importation process. Another phase, the entry phase, may include a series of processes and procedures whereby data relating to specific shipments and associated documentation are recorded and maintained by the importing company. Entry packets are submitted by a customs broker to U.S. Customs, as described above. Audits may be performed during or after this entry phase, and U.S. Customs typically gives a several day window for an importer to submit an amended entry packet in the event that an internal audit identifies errors or inconsistencies in the customs broker's information versus information maintained by the importer. The entry process may also involve a sophisticated scheme for entering, maintaining, and reviewing various types of records and documentation.

A post-entry phase is one in which the importer may integrate additional information from other sources (such as the receiver of the shipment) and may perform a post-entry audit by comparing information regarding classification and shipments obtained from various sources to information concerning the actual number of items that entered into the United States during the entry process. As discrepancies or errors are flagged during post-entry audits, and shortages or overages in tariffs paid are identified, the importer may fill out a formal Amendment to bring these discrepancies to the attention of U.S. Customs. The disclosures herein relate primarily to this process of auditing, amending and balancing entry data during the entry phase.

Finally, a subsequent amendment phase may also exist wherein various third parties, including U.S. Customs, customs brokers, suppliers, divisions internal to the importer, and others, may request information from the customs division of the importer. The customs division of the importer may thereupon perform a series of inspections, audits, or data-gathering processes in order to provide the requesting entity with the documentation it needs.

FIG. 1 shows an illustrative block diagram of the entities that may be involved in a typical importation process. An importing company 100 may include a single company operating domestically, or may include a number of divisions located both domestically and/or abroad. The importer 100 may also employ its own customs department or division for managing the overall importation process. The importer 100 may, for example, be a supplier of automobiles, motorcycles, and automobile parts. As such, the importer 100 may use a number of different vendors or suppliers to supply parts to the importer 100 or on behalf of the importer 100 for entry into the United States. When the importer wishes to import a shipment of merchandise, it may provide relevant information about the shipment and its classification criteria to a separate customs broker 104. The customs broker obtains this information from the importer 100 and, through the importer 100, separate vendors, suppliers, foreign manufacturers, and freight forwarders 102, may identify information pertinent to the shipment earmarked for entry into the United States. The customs broker prepares the appropriate paperwork for presentation to U.S. Customs 106 for the purposes of determining the correct duty to be paid. The forms prepared or presented by the customs broker may include a CF7501 form (also known as a 7501 form), commercial invoice, and shipment manifest.

After the duty is paid and the products are imported from a port of origin into the United States at a designated port, various types of audits may be performed by the importer 100 or by Customs 106 to ensure that the goods entering the country were appropriately classified per U.S. Customs regulations and that the proper tariffs were paid by the Customs broker.

A description of a TCS as used in the present disclosures is introduced herein to streamline the entire process for all phases of importation of goods into the United States. The TCS may include an integrated web-based application that is designed to improve, and facilitate ease of, compliance with applicable import regulations. The TCS may embody a collection of networked database structures, including a mainframe system or collection of data storage devices for storing information and a Global Integrated File Transfer ("GIFT") for transferring data through a secure conduit to various divisions of the importer, including, for example, divisions located in foreign country, if applicable. For example, a company may create a new part number and store the part information relevant to U.S. Customs compliance. The information may be kept is a particular database, residing in one embodiment in the corporate mainframe system and available for authorized users on the corporate intranet. Parts may be periodically added to the database, and information pertaining to these parts may be updated and amended as appropriate. The TCS in one embodiment includes an integrated and user-friendly tool set to maintain customs-related records in a coherent and logical manner so that they can be easily identified, linked to other related documentation, audited, and modified as appropriate. The TCS may also include an electronic system for providing efficient and more accurate audit procedures. Such audit procedures are made efficient and the associated changes to records, if any, may be inserted into an integrated system for cohesiveness and availability to relevant personnel. Navigation through this integrated system can be made relatively seamless. Entries and amendments into this system may be linked together in a logical structure so that the importer can (i) accurately generate classifications and other records, (ii) efficiently interface with outside vendors and customs brokers, (iii) identify and correct any discrepancies in records maintained in the system and/or presented to U.S. Customs, and (iv) accurately and more efficiently reimburse customs brokers for tariffs paid. Detection and correction of discrepancies, as well as balancing of shipping invoices against payment records, will be explained in further detail below.

The information in the database may be transferred to other divisions of the company. Consider the case of a corporation that has locations in the United States and Japan. In this situation, the corporation located in the United States may maintain a master database of parts along with the requisite information relevant to U.S. Customs compliance. The "sister" corporation or division in Japan may manufacture those parts for importation into the United States, or it may obtain those parts from foreign vendors. Alternatively, the foreign vendors may directly import certain products into the United States on behalf of the corporation. The corporation in the United States may periodically transmit information pertaining to its database of parts and relevant Customs classifications to the corporate division in Japan, so that the latter has the necessary information to keep its records up to date with the domestic division. In this instance, the United States division of the corporation may transmit the relevant part and associated information to the Japanese division via the GIFT interface referenced above. The GIFT conduit provides for a secure and reliable method of periodic delivery of information between corporate divisions located in different regions of the world. Other secure methods of transmission may be contemplated.

FIG. 2 shows a flow diagram of the TCS system in accordance with an embodiment of the present disclosures. For conceptual purposes, the process flow may be segmented into four discrete processes: (i) the pre-entry or classification process (103), (ii) the entry process (105), (iii) the post-entry process (107), and (iv) the audit process (109). Generally, block 75 and associated blocks 79, 81, 83, 85, 87 and 89 represent information sources that may be used for the various processing steps. In addition, blocks 143, 145, 147 and 149 represent various potential recipients of pertinent information. Blocks 113, 115, 117 and 119 reflect specific functions that may be performed in connection with the processes with which they are respectively associated. Cylinders 121, 123, 125, 127, 129 and 131 represent the actual integrated database repositories within which various items of information may be stored. Not explicitly shown in this figure is the web or other interactive application interface to enable the user to access and manipulate the various data structures as necessary and in accordance with each phase of the importation process.

The pre-entry process 103 will first be described. For purposes of this embodiment of the TCS, the pre-entry process is the initial process whereby the importer performs the relevant classification of the imported parts consistent with U.S. Customs regulations for the purpose of determining the tariff to be paid. The sources of information 79 for the pre-entry process are pertinent U.S. Customs regulations and rulings (e.g., from a Customs tariff handbook or other source) and, in this embodiment, a PWC tool set which embodies a comprehensive collection of those regulations and rulings. In the embodiment described, the PWC is a software tool set including a plurality of Excel spreadsheets, a data set integrated within the spreadsheets, and an image file of each part or item subject to classification. The PWC tool set may contain a comprehensive and encompassing collection of bases for classifications of various HTS codes to different parts, including regularly updated rulings which impact the classification criteria for assigning HTS codes. The PWC tool set may be electronically updated on a periodic basis, and may be available for consultation by users of the TCS who are performing relevant classification functions.

Classification criteria 91 and 111 may collectively represent a "decision tree" which, in one embodiment, includes a series of Excel spreadsheets designed to allow an employee or trade compliance analyst of the importer to isolate, for a part of interest, a particular HTS code. Generally, the U.S. Customs classification process may require that a series of questions relating to a particular item for importation be answered. That is, items for importation are categorized based on certain criteria provided by U.S. Customs (and subject to U.S. Customs rulings). As explained at greater length below, at the top of the decision tree in the classification criteria blocks 91 and 111 may be an initial classification group or a commodity group. The analyst may begin with the commodity group corresponding to the item at issue, and may be led through the decision tree by answering questions specific to classification of that part (e.g., The part's function? The part's composition?). When the analyst comes to the end of the decision tree, he or she may arrive at a particular HTS code, which may then be assigned by the TCS to the item at issue. That assignment may thereupon be stored in the TCS database for subsequent use and appropriate review.

Figure 4:
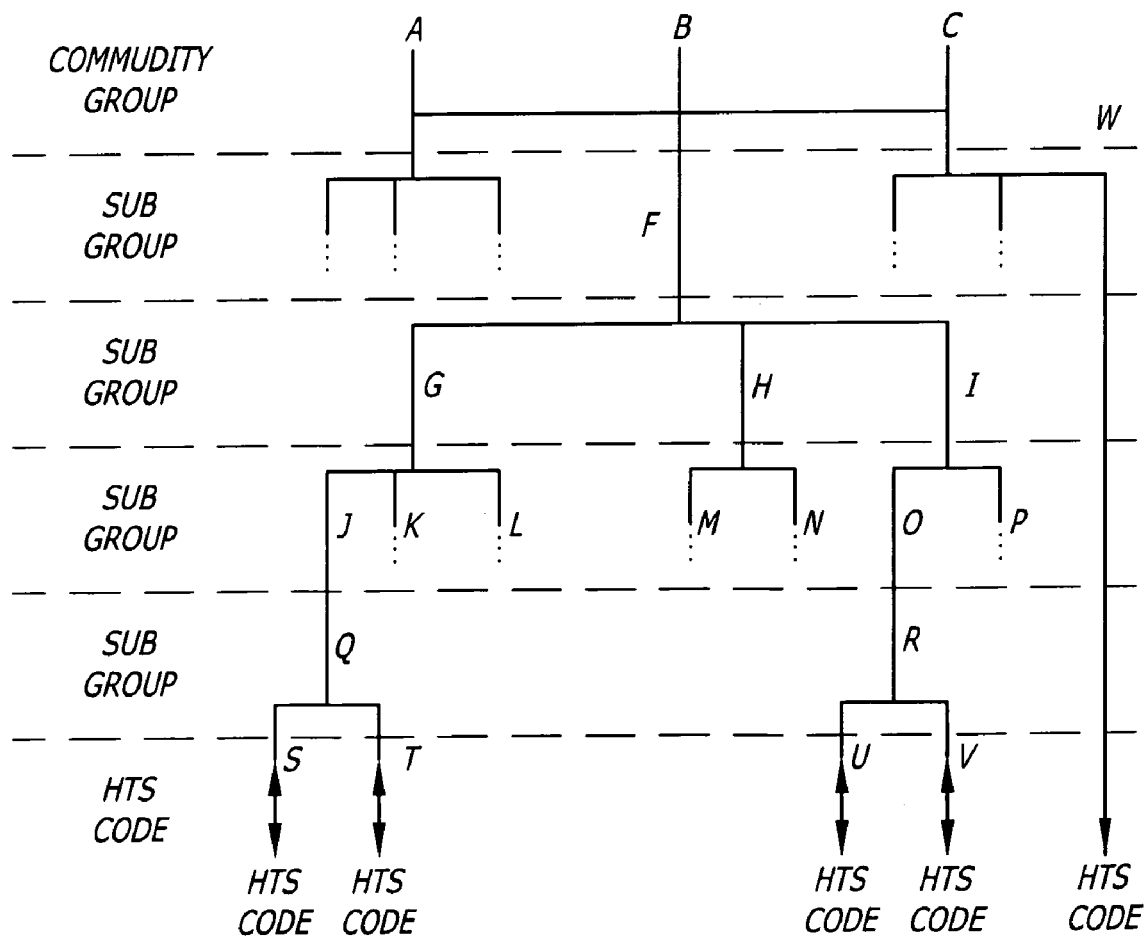
FIG. 4 is a diagram of a decision tree in accordance with an embodiment of the present disclosures.

A conceptual diagram of the decision tree used in the classification criteria step 91 and 111 is shown in FIG. 4 (described below). While an Excel spreadsheet is used for purposes of this embodiment, other applications may be equally suitable for formulating the decision tree and such applications fall within the scope of the present disclosures.

Referring back to FIG. 2, block 81 represents exemplary information sources that may be used by the analyst to (i) determine the parts to be imported into the United States, and (ii) assign the appropriate HTS codes to those parts in light of the classification criteria 91 and 111. Sources for this information include "ABD" (e.g. a division of the importer abroad), "Co." divisions (domestic divisions of the importing corporation), and any other foreign manufacturers or suppliers 81 that are working for or in concert with the importer to supply imported parts into the country on behalf of the importer. Such information sources may include orders, invoices, bills of lading, and the like.

In step 93, the analyst may utilize the classification criteria 91 and 111 (as described above) to determine the specific type of product to be imported and its relevant attributes. As noted above, the attributes of the product may dictate what specific classification the product falls into, and therefore what HTS code will ultimately be assigned to the product. However, other product attributes may be important in performing various import functions. For example, a product entitled to a NAFTA certificate may be given special treatment by U.S. Customs. The applicability of anti-dumping or countervailing duties may be identified for specific items. DOT, FAA and other regulations or restrictions may further be relevant to certain products. Accordingly, at step 93, any additional product attributes beyond classification for tariff purposes may be assigned by the analyst.

In addition, as shown in block 83, foreign corporate divisions and/or foreign vendors may supply vendor addresses 95 to the importer. These addresses may be used in connection with the pre-entry process 103 when assigning certain product attributes or for classifying certain parts where origin of those parts is a relevant criterion.

Block 113 of FIG. 2 represents a summary of three specific functions that may be performed in the pre-entry process 103 in one embodiment of the teachings herein. First, the analyst may perform the appropriate classification of the product using the decision tree, a U.S. Customs handbook, and the PWC tool set to identify a basis for the classification. Second, as discussed above, the analyst may assign any relevant product attributes (e.g., NAFTA certificates, etc.) that may bear on an issue pertinent to importation, duty paid, or U.S. Customs. Third, the analyst may identify various details concerning any foreign manufacturers or suppliers whose parts, for example, are earmarked for importation into the United States. The analyst may store information regarding the identity of these foreign manufacturers and any criteria relevant to the classification process of the items they provide. Product origin, appropriate classification using the decision tree database and justified by information from the PWC tool set, and other features pertinent to entry into the United States may thereby be assigned or identified in step 113.

The procedures outlined in step 113 may be performed in connection with an integrated TCS database 124. The TCS database 124, in one embodiment, may constitute a collection of related data repositories which may take a variety of forms such as tape drives, hard disk drives, non-volatile memory, etc. The integrated TCS database 124 may include a collection of data-specific repositories including an HTS Master 121, Item Master 123, Vendor Master 125, Entry History 127, Payments and Adjustments 129, and Amendments 131. The various functions of these repositories will be described as they become pertinent to the description at hand. Generally, the type of physical storage devices that may contain these repositories of information will depend on the characteristics of the importer. For example, where the importer is a single business entity operating in a building on the west coast, the database may constitute a plurality of appropriately-configured hard disk drives controlled by a central computer. Where the importer is a large and sophisticated business entity with multiple divisions, the database may be networked, geographically distributed, stored as a SAN ("Storage Area Network"), stored on tape drives, or otherwise.

The HTS Master 121 in the embodiment shown may constitute a comprehensive database repository of HTS codes, loaded and updated periodically from a U.S. Customs tape. The HTS Master 121 may be linked to an Item Master 123, which is an information repository of parts for importation. The Item Master 123 in one embodiment has links to corresponding HTS codes. As such, the analyst can select a specific product from the Item Master 123 and click on the product as a link, which may bring up a corresponding HTS code from the HTS Master 121 along with the applicable rules for classification which correspond to that code, as well as other information relating to the shipment.

In addition, a Vendor Master 125 may include a linked repository of information concerning the identity of various vendors whose parts may be imported into the United States for or on behalf of the importer. Associated with each vendor in this repository, if applicable, is a collection of information pertaining to the attributes of that particular vendor that may be pertinent for compliance with U.S. Customs regulations. In one embodiment, the Vendor Master 125 may also be linked to the Item Master 123 and HTS Master 121, so that an analyst can seamlessly navigate through information pertaining to a particular product for importation, any relevant product attributes, pertinent information concerning a particular vendor, and the applicable HTS code associated with that product.

In step 133, the analyst may extract the pertinent classification information which may constitute an electronic report containing a comprehensive list of the parts and products to be imported at a given time, the associated HTS codes, the justifications for assignment of those codes ("bases for classification"), and other information pertaining to quantity, etc. This analyst may then provide this classification information to an ABD division (e.g., a corporate division abroad), to various domestic corporate divisions, and to the customs brokers that may actually be providing the forms to U.S. Customs and paying the tariffs on the items to be imported. These entities are referenced in block 143.

The entry process 105 will now be described. Generally, the entry process 105 may refer to a series of events that occur during and after the entry of the goods into the United States. The TCS in one embodiment provides a vehicle for enabling accurate and efficient recordation and performance of entry-based functions. The TCS also may provide a link from information relating to events in the entry phase to information relating to other phases, including classification.

A customs broker typically submits an entry packet to U.S. Customs that corresponds to an importation of specific merchandise. The customs broker also pays the applicable tariff based on the importation of that merchandise. In the entry process 105, the initial information sources as referenced in block 85 may be, among others, the suppliers, freight forwarders, and customs brokers. The suppliers are typically (although not necessarily) the manufacturers of the part(s) to be imported. The parts from the suppliers may be provided to the freight forwarders, who may assume the responsibility of actually shipping the goods from the location abroad into a port in the United States. Customs brokers such as, for example, FEDEX Trade Network or UPS, handle and process the documentation pertaining to the importation of the products once they reach the United States. In preparing the necessary entry packets for submission to U.S. Customs, the customs brokers may often rely on information concerning the shipment(s) at issue from the suppliers and freight forwarders, or the importer (block 85).

In the embodiment shown, the customs broker receives the classification information prepared by the importer's analyst (block 143). In addition to that information, the customs broker may receive all relevant documentation and information from the suppliers and freight forwarders, such as the invoices and bills of lading of the parts to be imported (block 85). Based on this information, the customs broker may gather information sufficient to prepare an "entry packet" of information relevant to the imported products, including their classifications, commercial invoices, etc (block 97). The entry packet may also include the U.S. Customs 7501 form which sets forth the tariffs to be paid on the imported products based on the values provided by the suppliers and the bills of lading. The entry packet may also include the commercial invoice(s) along with a shipment manifest. In one embodiment, the entry packet is in an electronic format so that it can be seamlessly inserted into the TCS database 124, as shown in step 115. In particular, the entry packet includes a series of electronic documents and images, rather than paper copies. This information can thereupon be inserted into the Entry History repository 127 of the TCS database 124 for record keeping purposes. In this manner, the entry process may be effectively coordinated with the pre-entry process because all information is kept in a central integrated database. That is, the TCS provides a logical link from the entry history repository 127 to the other data repositories, so that all of the items can be cross-referenced and a user can navigate among the repositories to find necessary information (e.g., in performing audits).

In one embodiment, the customs broker has access to the Item Master 123, which may also be called the product dictionary. As needed, the customs broker can consult the product dictionary to ascertain part attributes and identify the HTS code classifications assigned to items by the importer. After the customs broker has all the necessary information from the suppliers, freight forwarders, and the customs department of the importer, the customs broker may collect and prepare the comprehensive entry packet information (step 35) and submit that information to U.S. customs as the shipment enters a designated port in the United States and is received by U.S. Customs (block 145). The customs broker will typically also pay the necessary tariff on behalf of the importer. In addition to submitting the entry packet information to U.S. Customs, the customs broker may also submit the entry packet to the company's Customs department (or similar group responsible for maintaining such records) (step 145). The entry packet information can then be incorporated into the entry history repository 127 of the TCS database 124, where it can be subsequently analyzed and audited (see below). In sum, in the entry process of one embodiment, (i) the goods are imported into the United States, (ii) the customs broker prepares an entry packet of information describing the relevant attributes of the goods for the purpose of computing tariffs, (iii) the customs broker submits the entry packet to U.S. Customs and back to the importer, and (iv) the customs broker pays the applicable tariff on the imported goods to be subsequently reimbursed by the importer. In addition, the entry packet information supplied by the customs broker in electronic format may be integrated into the TCS database for accurate record-keeping and auditing purposes.

Post-entry 107 represents the process whereby discrepancies are detected and necessary adjustments (including audits for shortages and/or overages) are made. In particular, an audit may be performed whereby the quantity and other relevant attributes of goods actually received in the United States by a receiving business entity such as a division of the importer—including the corresponding tariff actually paid by the customs broker to U.S. Customs—is compared with the quantity and attributes of the goods listed in the description in the entry packet and the tariff computed prior to or during entry of the goods into the United States. As discussed in further detail below, any appropriate adjustments may be made based on discrepancies identified between the information in the TCS concerning a shipment and the actual shipment received by the intended domestic entity.

Generally, after goods are shipped into the United States, the importer may receive post-entry information from various sources concerning the shipments. The applicable receiving division of the company, including other corporate divisions, may report to the importer the actual amount and nature of parts imported into the United States. For example, if 600 widgets were to be shipped from a vendor in Japan to a parts division of the importer in the United States, the receiving parts division may report to the importer the actual number of widgets received. If 800 widgets were actually received but 600 widgets were documented by the analyst in the entry process and the tariff was computed and paid based on that understanding, for example, an overage may be identified and an adjustment prepared for submission to U.S. Customs to notify it accordingly (i.e., not enough tariff paid). Conversely, if 400 widgets were actually received but 600 widgets were documented by the customs broker and a tariff were paid on the full 600 widgets, a shortage is reported. The post-entry process 87 of the teachings herein addresses a method for streamlining the shortage/overage adjustment method for increased efficiency and accuracy, and for enabling more organized integration of electronic record keeping.

Accordingly, in this embodiment, based on the information sources in block 87, electronic records of the amount of payments made and goods actually received in the United States may be generated (step 99). This information may then be compared with the information contained in the various repositories of the TCS (such as, for example, the Item Master 123 and the entry history 127). This comparison is one of the post-entry functions, and comprises an entry audit (step 117). Essentially, what was imported into the United States should usually be the same as what was actually declared by the customs broker to U.S. Customs. The Entry History 127 may be updated accordingly to account for any discrepancies.

In addition, as part of the post-entry step 117, payment balancing may be performed whereby the declared value is compared to the actual payment made to the supplier. This information may be updated in the Payments and Adjustments repository 129, integrated in one embodiment within the TCS database. Accordingly, when shortages or overages are paid or received, this information may be updated in Payments and Adjustments 129. In addition, where an audit entry history based on information in the Item Master 121 or other information reflects an error condition, an audit exception may be generated. That audit exception may, for example, be recorded as an amendment in Adjustments repository 131. Thereupon, an entry amendment 137 may be generated and reported to the importer's customs department, the customs broker, and U.S. Customs (block 147). The entry amendment may reflect a report of an overage paid to U.S. Customs, so that the importer may be appropriately credited for its overpayment of tariffs. Conversely, the entry amendment may reflect a report of a shortage, so that the customs broker or importer may need to pay an additional duty to compensate for the tariff underpayment. Where an amendment is submitted as in 137, the Payments and Adjustments repository 129 may be updated accordingly to reflect the shortage or overage and corresponding additional remittance, if any, to U.S. Customs.

In addition, an audit process 109 may be integrated into the TCS. As part of this process, information requests 101 may be received from a variety of sources, such as from U.S. Customs, the importer's internal customs department, other divisions of the importer, etc. (block 89). These information requests may be for various purposes, such as internal record-keeping, tax compliance, external audits, or other purposes. In the course of this process, management reports, ad-hoc reports or other files may be generated for business purposes or for further refinement and compliance with U.S. Customs procedures (step 119). In one embodiment, the audit process 109 and associated functions 119 are linked to the integrated TCS database 124 so that information may be transferred to and from the various repositories and records and may be electronically updated and easily accessed and modified as necessary. The reports and extracted files based on this audit (139 and 141) may be thereupon submitted to the requesting entity, as shown in block 149. The requesting entities may include U.S. Customs, corporate divisions, corporate customs, or other sources.

As can be seen from FIG. 2, the TCS may provide a sophisticated level of integration between the four phases of operation in customs compliance. As will be seen, the web-based or other application that allows the user to input, access, and update the information in the underlying repositories may provide robust navigational capabilities and may allows for cross-checking for accuracy and consistency with regard to the information recorded in various phases for a given shipment.

Figure 3:
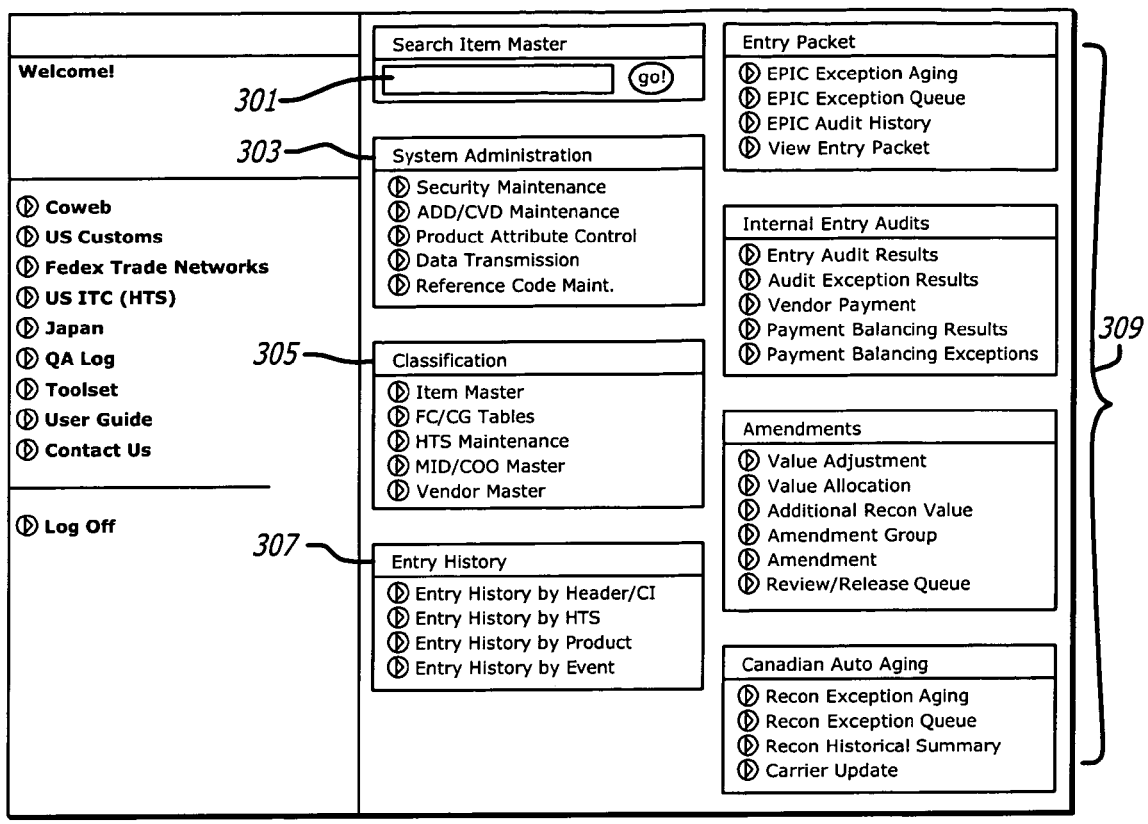
FIG. 3 is a main menu screen in an exemplary TCS in accordance with an embodiment of the present disclosures.

FIG. 3 shows an example of a main menu screen of the TCS. Once a user logs into the system, the user can navigate through the entire TCS database system to perform various functions, provide updates, or enter information. Blank 301 in this example may allow an analyst to perform a search of the Item Master repository. Menu 303 provides various options available to a system administrator. Menu 305 provides options for classification, including providing links to the Item Master and Vendor Master, among others. Menu 307 enables the user to view the entry history of a shipment or set of products based on a variety of different criteria. Menus 309 may provide a large variety of additional options for navigating through the TCS and accessing or inputting information during the various phases of the importation process.

Assignment of HTS Codes

Generally, to comply with applicable Customs regulations, companies may assign HTS codes in the required format for imported and exported parts. HTS is the tariff schedule used by U.S. Customs. HTS may be used to identify imported items to U.S. Customs, to determine the rate of import duty, and to identify additional compliance information required for imported products. HTS assignments are based on criteria including, for example, U.S. Customs HTS, Customs Rulings, Customs Request for Information (CF-28), Customs Notice of Action (CF-29), telephone notifications from customers of the company, and Customs corrections to the entries.

In general, a company may assign HTS codes for all products and all related product information prior to point of entry—i.e., into the United States. The mechanisms associated with preservation of all of this information can be complex to say the least. A Customs entry generally may not be filed without an accurate classification. Further, new parts should be classified before shipment. In addition, all required trade compliance-based part technical information should be available at the time of classification. When a new part number is established, the required trade compliance-based part technical information may need to be defined and stored. To help ensure compliance, the company should be able to classify, at or before the time of import, any unclassified parts. Any changes regarding classification that affect other aspects of or information in the database should also be updated.

A company may generally maintain an audit trail of HTS assignments and changes per Customs requirements. The company should be able to provide sound rationale and proof of consistency in the assignment of HTS codes. Further, the company should be able to audit and modify the expanded parts description for Customs, HTS codes, rationales for changes or HTS selections, etc.

For all of these reasons, a company should have a robust TCS that enables a company to easily navigate to various HTS codes that are associated with various commodity or classification groups. The system should include an integrated yet user-friendly mechanism for auditing, sorting, comparing, and generating reports of parts, descriptions, HTS codes, and other classification criteria at will.

In one aspect of the TCS, a classification process is based on a system of "commodity groups." A commodity group is a category of merchandise that is assigned to a product to narrow the range of possible HTS code assignments as a beginning procedure for an analyst in working toward a specific tariff classification.

In determining a classification, the domestic corporate division in this embodiment may make use of various database information and various types of selection tables. A selection table is a spreadsheet laid out in a decision-tree format that starts with a commodity group and, based on part data, allows step-by-step refinements in classification until a single HTS code is isolated. Selection tables may rely on answers to questions such as material, location, measurement, and function.

Accordingly, in one embodiment of the present disclosures, a TCS including a decision tree classification system may be implemented for enabling seamless and organized access to, and preservation of, necessary information to ensure full compliance with applicable Customs laws and regulations. The TCS may include an integrated network, web or other application that preserves and maintains access to required Customs information such as Classification, Quantity, Transaction Value (Reported and Unreported), Record keeping, and other specific parameters or compliance areas that may be necessary to meet or comply with the numerous and specific standards for imported items. Depending on the particular company, the parameters above may describe many different types of imported items such as, for example, automobiles, service replacement parts, motorcycles, power equipment, racing parts, and the like.

TCS may enable the selection, extraction, storage, and maintenance of HTS information so that the pertinent user can inquire, update and report on the tariff schedule. In one embodiment, the HTS validates each imported item with the appropriate duty rate(s) and tariff structure for proper classification as described in the HTS.

The decision tree classification system may include an application or set of applications, such as a client/server application suite or a web application. The system may allow an analyst to quickly and efficiently associate an HTS code with a particular product, and to preserve that association electronically for future record-keeping purposes. Acting through a user interface and under the control of a database management system, an analyst or applicable company employee or contractor may select among a number of different commodity group classifications at the top of a decision tree database as a first step in assigning an HTS code to an item designated for subsequent importation (The decision tree database may be commonly referred to as a hierarchical database). The analyst may use the database management system of the TCS to navigate to a particular commodity group by first navigating to a menu containing a subset of specific commodity group selections. The analyst may proceed to navigate down the decision tree by successively making more specific classification group selections until the analyst ultimately arrives at the end of a branch— namely, a particular HTS code. This code may then be automatically assigned by the computer application to the specific product at issue and the assignment may thereby be recorded in the TCS database.

FIG. 4 shows an example of the decision tree according to an embodiment of the present disclosures. The decision tree is implemented in this embodiment as a part of the pre-entry process as described in greater detail in connection with FIG. 2. Letters A, B, and C represent respective commodity groups. Using the TCS system, the analyst can select the appropriate commodity group for the product he or she wishes to classify. The analyst thereupon navigates to a first subgroup which may include option F. If the analyst selects commodity group B, for example, the analyst's selection may link to sub-group F, which presents to the analyst in one embodiment a question about the product (such as the identity, function or composition of the part). These questions may be classification tools provided by U.S. Customs and used for determining appropriate HTS codes for tariff rates. The analyst in this example has three options in a second sub-group consisting of options G, H, and I. In one embodiment, G, H, and I represent second questions concerning the nature of the product to be classified. For example, G, H and I may provide various options relevant to the composition of the product at issue. Depending on the analyst's selection, the analyst may be navigated to a third subgroup comprising a series of additional questions regarding the part at issue—namely, J, K, L, M, N, O and P. Assuming the analyst selects J, the analyst is brought in this example to a fourth subgroup which includes question Q. The analyst then answers the question by selecting, e.g., one of two answers S and T. Assuming the analyst selects S, the analyst is brought to the correct HTS code for that product, which is thereby assigned by the TCS system to the applicable HTS code. This code can subsequently be transmitted along with other information to the pertinent data repository as well as to the customs broker as various shipments for importation are scheduled.

In other embodiments, the analyst may select a commodity group and directly be linked to an applicable HTS code. Further, in the example where the analyst selects commodity group C, the analyst may thereafter select option W in one sub-group and be directly linked to the appropriate HTS code without being required to navigate through additional sub-groups.

The TCS may be accessed by an individual with applicable permissions by, for example, signing into the TCS with a recognized username and password. The TCS can include a "main screen" similar to the screen shown in FIG. 3, which may simply include a web page with color-coded groups of various TCS applications to facilitate identification and navigation. Various screens may be displayed on the web page.

Thus, in one aspect, the TCS may include a system of classification groups, also known as commodity groups. As noted above, a commodity or classification group is a category of merchandise that is assigned to a product to narrow the range of possible HTS code assignments as a first step in working a specific tariff classification. Thus, for example, where an individual at a corporation responsible for pre-classifying parts is working with the TCS, the individual can commence the procedure by selecting a relevant commodity group from a menu.

Figures 5A, 6:
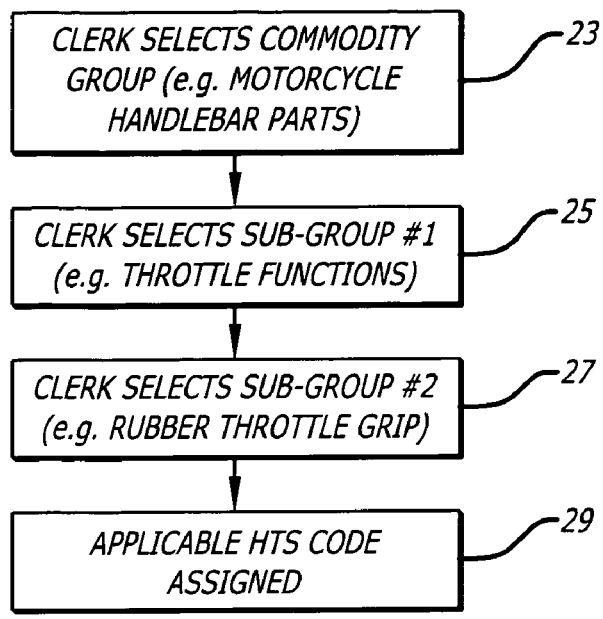
FIG. 5A is a flowchart of a decision tree classification system in accordance with an embodiment of the present disclosures.
FIG. 6 is a form for accessing a particular commodity group of interest in accordance with an embodiment of the present disclosures.

FIG. 5A is a flowchart illustrating the use of the decision tree in the assignment of HTS codes in accordance with an embodiment of the present disclosures. Assume, for example, that the analyst for a motorcycle manufacturer needs to assign an appropriate HTS code to a replacement part, such as a rubber throttle grip. The method of the present disclosures makes the analyst's task straightforward. In step 23, the analyst selects the application classification group from a menu in the TCS. For illustrative purposes only, the classification group may be "motorcycle handlebar parts." The analyst may then be given a list of alternatives in an exemplary subgroup # 1, in step 25. One such alternative, for example, may be "throttle functions". The analyst may then selects that alternative and thereupon may navigate to the next menu, as shown in step 27. The analyst may be presented with a further list of possibilities, one of which may be "rubber throttle grip" or the like. Associated with the part description may, depending on the embodiment, be a number of additional descriptive information such as a part number, the motorcycle brands to which the part corresponds, and other relevant information. The analyst may then select the "rubber throttle grip" in sub-group # 2, and arrives at the correct HTS code for the part at issue, as shown in step 29. At that point, the correct HTS code may be assigned to the product to be imported, and the assignment may be recorded in the Item Master.

Figure 5B:
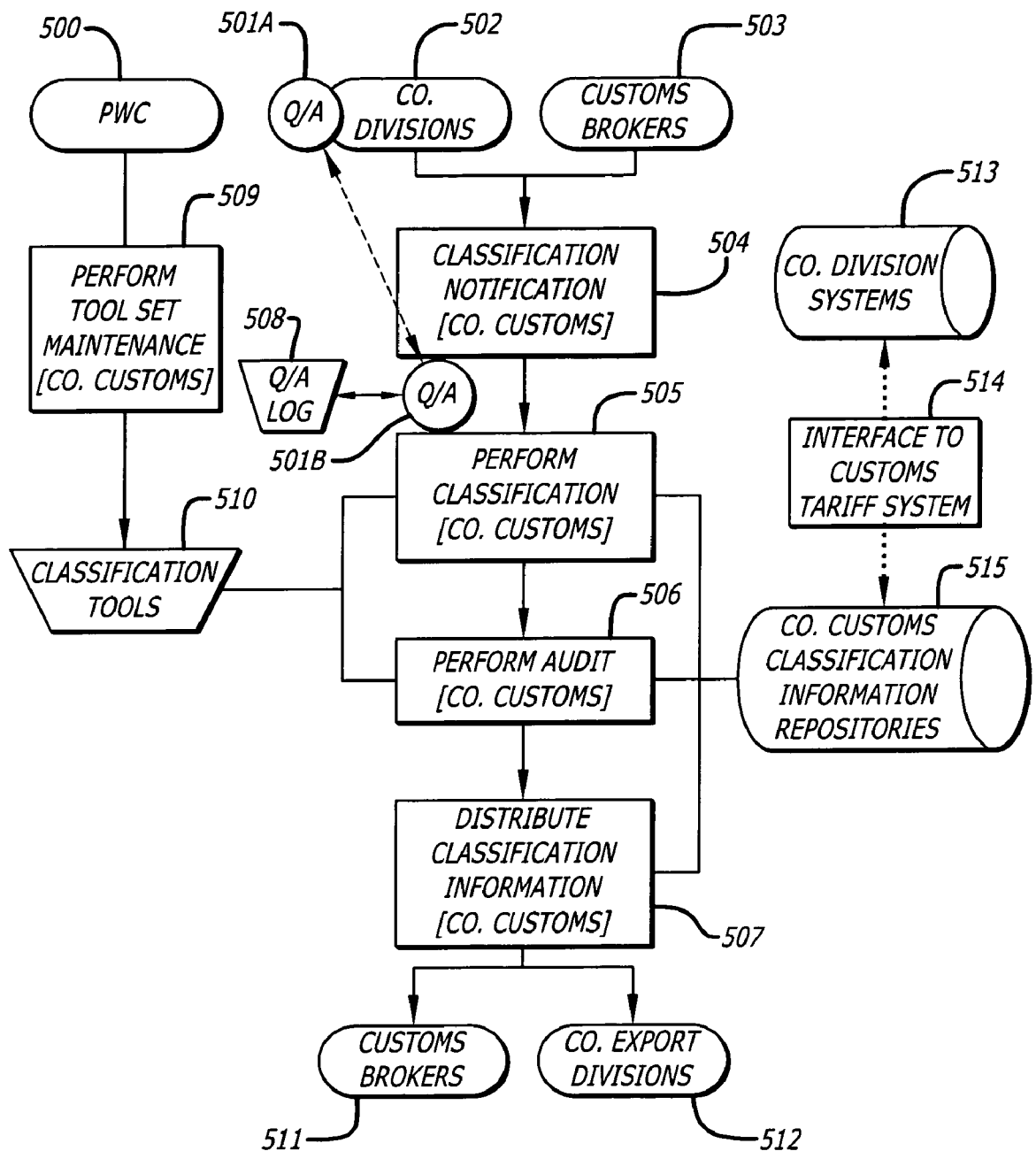
FIG. 5B is flowchart of procedures and entities involved in a classification process of the TCS in accordance with an embodiment of the present disclosures.

FIG. 5B is a flow diagram that depicts an exemplary pre-entry process in accordance with an embodiment of the disclosures herein. In this example, "Co. Customs" represents a division of a company that is responsible for obtaining product information from other divisions of the company and applying appropriate classification information for importation purposes. This step is described in more detail in the pre-entry process above. "Co. Customs" may obtain relevant information (step 504) from other company divisions 502 and customs brokers 503. As discussed above, various additional sources may trigger classification adds or changes. Notifications requiring action include the introduction of new models, customs ruling changes, self-audit discovery, or codes missing at entry. Using this information, the importer may perform appropriate classifications (step 505). That is, "Co. Customs" may assign HTS codes to products, along with other required information such as extended customs descriptions, legal rationale, and timestamps. "Co. Customs" may track Questions and Answers (501A, 501B) with other company divisions during the notification process. A Q/A log 508 may be created that contains information pertinent to product classification. "Co. Customs" may also perform the classification step and any subsequent audits to identify errors or discrepancies (step 506), as deemed appropriate. All classification information, associated bases for classification, and errors discovered during a subsequent audit may be entered into the TCS classification information repositories 515.

During this process of pre-entry classification, the user may take advantage of the PWC tool set 500 (which may represent a spreadsheet including a comprehensive list of Customs rulings and bases for HTS classifications) and other classification tools 510 (such as information from third parties or the U.S. Customs Tariff Book) to help ensure the accuracy of its classifications and to provide the required bases for each classification. In addition to performing the actual HTS classifications, the importer should ensure in this illustration that the PWC tool set is kept up to date and accurate by performing periodic maintenance, as shown in step 509.

Thereupon, in step 507, "Co. Customs" may provide updates to customs brokers 511 with the latest classification data and may provide information regarding importation to other divisions 512 of the company, such as corporate export divisions.

FIG. 6 depicts an illustration of a screen within the TCS application suite that permits a user to select an appropriate commodity group. The screen includes a template that allows a user to select among a group of different options. The user can enter a specific commodity group as shown by option 615. In addition, the user may decide to enter other types of criteria, such as by inserting a specific selection table number as in blank 613.

As an illustration, an employee of a automobile manufacturer may need to classify a particular component that is part of a shock absorber of an automobile. Previously, the employee may have had to perform a lengthy or copious inquiry to identify and isolate the pertinent information associated with the particular part. This is especially true where the HTS procedures of the company are handled manually or a scheme for integration of the phases of operation is absent. In the present embodiment in FIG. 6, the user can easily navigate to the desired component by simply selecting the appropriate commodity group from the menu. The user may enter "ABSORBERS" in the entry 615. Alternatively, the user may select the navigational link "ABSORBERS" 619 from the commodity group menu 617. Thereupon, the user can simply navigate down through the decision tree to ultimately arrive at the appropriate HTS code, which then may be assigned to the component at issue and recorded in the TCS database.

As another example, a computer manufacturer may use a TCS whereby the user is responsible for assigning the appropriate HTS code to a particular component on a computer motherboard. Commodity groups and corresponding identifying questions are dictated by U.S. Customs criteria. For illustrative purposes only, the component at issue may be the integrated circuit used as the system BIOS. Instead of arbitrarily searching for HTS codes and records pertaining to the system BIOS, the user can start by selecting the (illustrative) commodity group "MOTHERBOARD." The user can then view the ensuing list of narrowing question categories (e.g., "processor circuits?", "system memory startup?", etc.) to discern which group is likely to include the component at issue. In this example, the user selects "system memory startup" from the menu, and thereby navigates to the next screen, which may contain a list of components, such as "CMOS clock", "BIOS" or the like. The user then selects "BIOS" and the applicable HTS code may be made available and assigned to the corresponding BIOS component to be imported. The classification groups in this example are for illustrative purposes only, and do not necessarily correspond to the actual groups associated with the Harmonized Tariff Schedule.

The TCS may include a selection table. The selection table may, for example, include an Excel spreadsheet laid out in the decision tree format described above. The spreadsheet starts with a commodity group and, based on part data, permits step-by-step refinement in classification until a single HTS code is isolated. The isolated HTS code can then be established for the part at issue. Other applicable spreadsheet applications may be equally suitable.

The ability for a user to navigate through the TCS and make various selections, observations, and modifications, renders the pre-entry process efficient and provides for a unitary repository of information that can be accessed as necessary by individuals in the corporation. The navigational structure of an exemplary TCS will now be described in the context of the pre-entry process. Various exemplary user interfaces are shown which reflect the benefits of the sophisticated yet robust navigational capabilities of the TCS. Information that in prior art implementations was segmented with limited or no navigational capabilities is now streamlined into a complete system. Specifically, in this embodiment four phases of an exemplary Customs compliance process are integrated together to provide a "checks and balances" system which ensures accuracy of information and provides for expedient and user-friendly search and navigational capabilities. The descriptive menus discussed below show examples of these navigational features in the context of the classification process.

Figure 7:
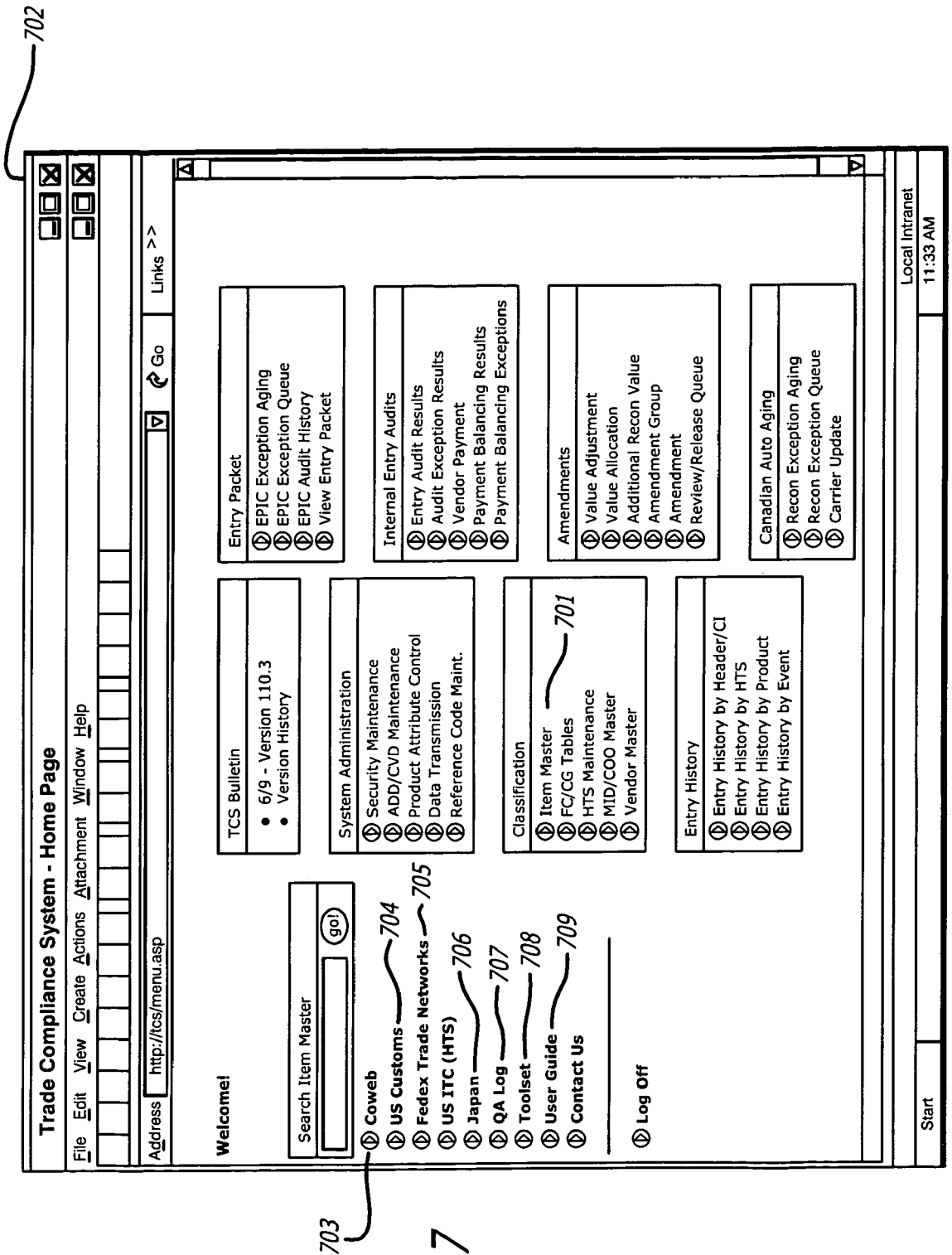
FIG. 7 is a screen of the TCS containing an Item Master classification link in accordance with an embodiment of the present disclosures.

FIG. 7 depicts an illustration of an exemplary main menu screen 702 of the TCS used in connection with the pre-entry process as described in FIG. 2. This screen 702 allows users to access the TCS on-line functions and other selected links to other Customs web sites and tools. As such, this web-based screen or similar user application is one of several features of the TCS in one embodiment. Screen navigation optimizes user efficiency in conducting HTS classification and other functions associated with the pre-entry process. As can be seen from the main menu 702, the various links throughout the TCS screens uniquely tie the different functions into intuitive workflows. One example in main menu 702 is the Classification "Item Master" function 701 which can be accessed directly from the main menu 702. A user wishing to identify an HTS code for an applicable part can simply select the "Item Master" link 701 and navigate to a page which lists, among other information, the selected part number and associated HTS code.

In addition, other links may provide more general navigational capability. "Coweb" link 703 may provide a link to the home page of the corporate intranet of the importer. "US Customs" link may provide a link to the U.S. Customs web page. "Fedex Trade Networks" link 705 provides a link to the web page of a customs broker. "Japan" link 706 may provide links to networks of the corporation located in Japan. "QA log" link 707 may provide a link to the log created by virtue of correspondence between the customs division of the importer and the customs broker. "Toolset" link 708 may allow a user to navigate to the PWC tool set. An online user guide may also be available via link 709.

Figure 8:
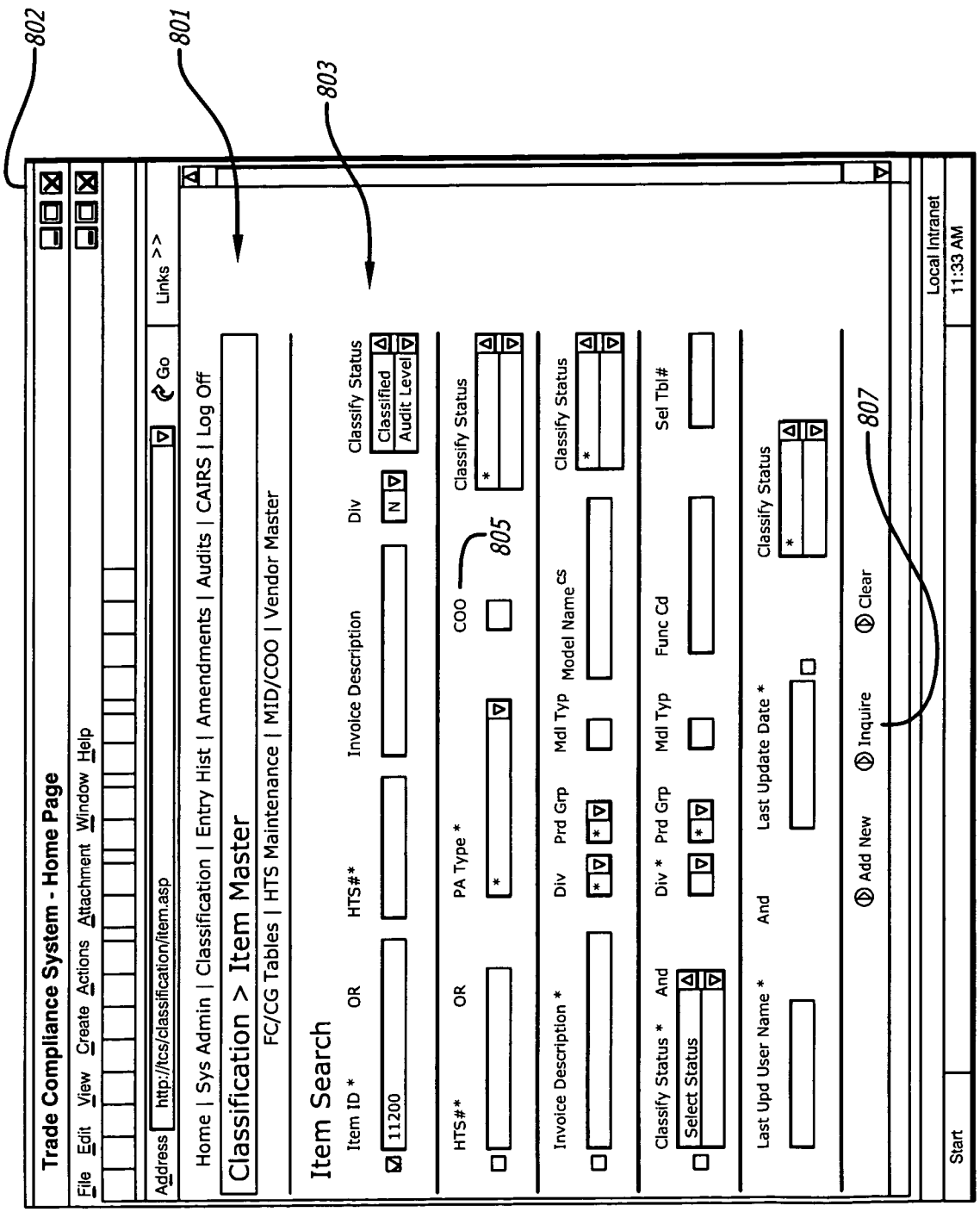
FIG. 8 is a screen for accessing an Item Master of the TCS in accordance with an embodiment of the present disclosures.

FIG. 8 shows another screen to enable a user to access information from the Item Master. In this example, the user has accessed the Item Master by clicking on the "Item Master" link 701 in FIG. 7, thereby arriving at the screen in FIG. 8. As shown by the area encompassed by 801, the TCS screen in this embodiment contains a "headline" logo which may include a plurality of navigation commands to all functions (e.g., "Home", "Sys Admin", etc.). Underneath the general navigation commands in area 801 lies the sub-functions within the group selected (in this case the Item Master Classification).

The illustrative screen in FIG. 8 contains a number of fields useful for the analyst to navigate through the TCS in performing the various pre-entry functions. A classify "Item Search" section 803 of the screen, for instance, may allow the user to select different sets of search path criteria depending on the function the user is performing. In this example, a partial item ID is keyed into the first search path along with search criteria Div=N and Classify Status=Classified. The user may then press the Inquire command 807 to execute the search and obtain the desired information of the item at issue.

In addition, various labels may be highlighted or colored, such as the COO entry 805, so as to represent links to other functional screens. This feature gives TCS users a unique workflow advantage and illustrates the utilities and advantages of the integrated repositories, which are appropriately networked (in some embodiments) and programmed to operate with overlying user-based software to facilitate ease of exploration of the TCS database system.

FIG. 9 shows a screen 902 which in this illustration is derived from the search performed in segment 803 using the inquire command as shown in FIG. 8. The results of the item search may be displayed in the "Item Summary" section 905. Note that the user may choose to go back to the item search, or perform a mass update of the item records selected, as shown by the options in 901. In addition, the user may change the search criteria and initiate another search. The result of the exemplary search performed produces a list of Item IDs in segment 905 with their corresponding "Div" values, Invoice Descriptions, Model numbers, HTS codes, Commodity Groups (if available) and Status. In the example of the "Item Summary" section 905 shown in the screen 902, the user chooses to display the Item Detail for record 11200-PWA-020 by clicking on the Item ID control value 903. This selection brings the user to the screen 1002 in FIG. 10, discussed below.

Figure 10:
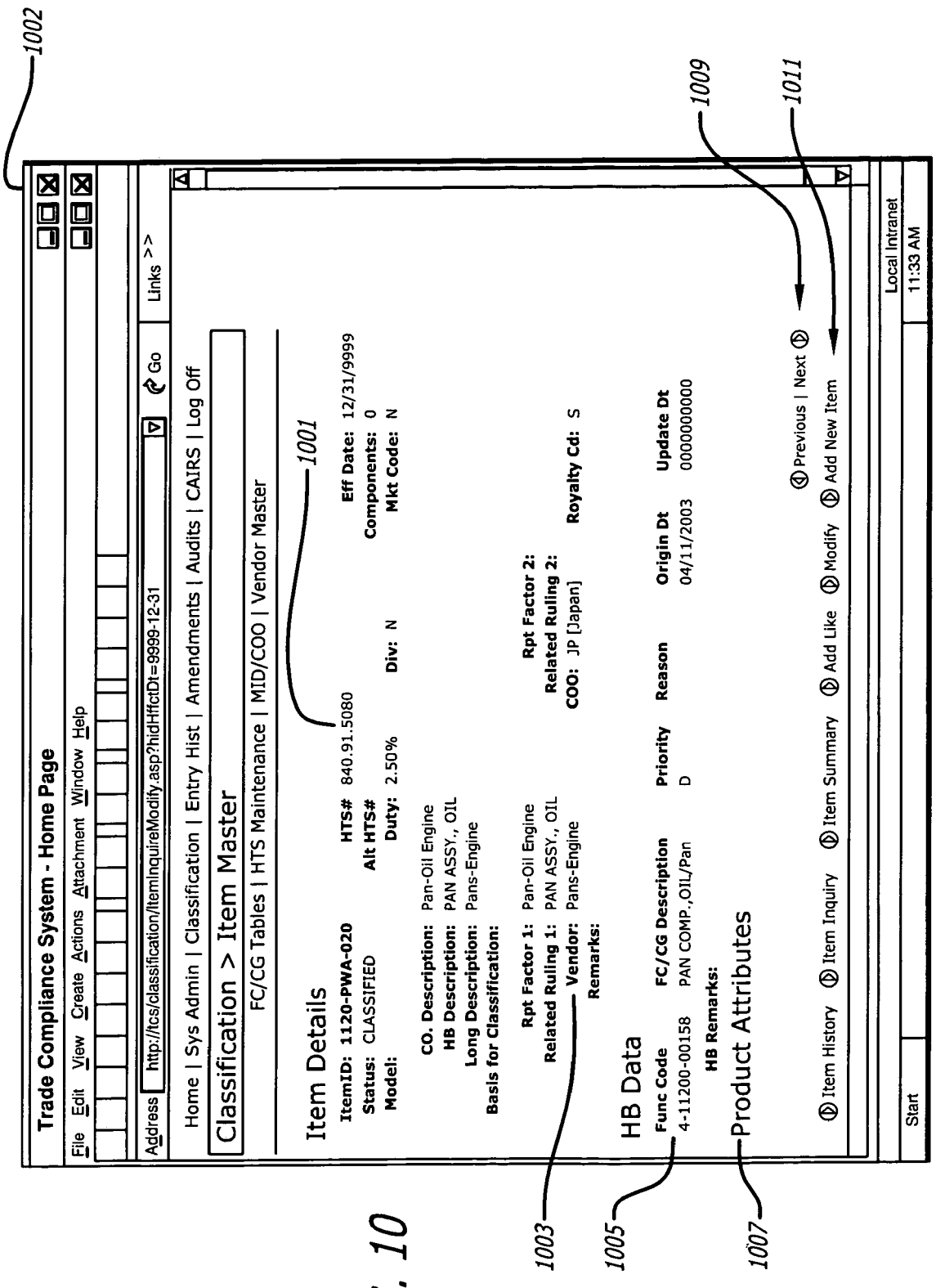
FIG. 10 is another screen for accessing an Item Master of the TCS in accordance with an embodiment of the present disclosures.

FIG. 10 is an illustration of another screen 1002 that presents a view of the Item Master repository. In particular, the details of the item ID 11200-PWA-020 selected in FIG. 9 are displayed. This item details screen may display all values for an Item Master record, and may provide the user with a plethora of navigation options. From this screen and the previous screen, the benefits of integrating information relating to imports using a structured database system for tracking importation-related data are readily apparent.

In the example of FIG. 10, the 10-digit HTS code 1001 corresponding to the item at issue is displayed. In this embodiment, the code is presented as a link, such that the user can navigate to the HTS Master screen of the HTS Master repository 121 (FIG. 2) simply by clicking on the displayed HTS value. In the embodiment where the trade compliance analyst has access to the Item Master, the analyst can simply insert or select a part number and view the relevant classification information of that part, as in FIG. 10.

Additionally, the "Vendor Identification" 1003 may be displayed, which in this example identifies the particular supplier of the imported item at issue. The "Vendor" field 1003 may itself constitute a link such that clicking on the vendor information 1003 navigates the user to the main master screen of the Vendor Master 125 (FIG. 2). A "Function Code" link 1005 may exist showing the associated function code of the product. This function code may, for example, be an internal code assigned by a division of the corporation abroad and used for business purposes to identify parts. In one embodiment, the "Function Code" 1005 also constitutes a link to a maintenance screen. A "Product Attributes" link 1007 may also be available for viewing special attributes of the item at issue (such as NAFTA certificates, anti-dumping information, etc.). As shown by links 1009, the user also may have the option to navigate to the next Item Master record or the previous record. Further, as illustrated by the set of options 1011, the user may also choose to view item history screens, to return to the item inquiry or item summary screens, to modify the records displayed, or to add a new Item Master record.

Figure 11:
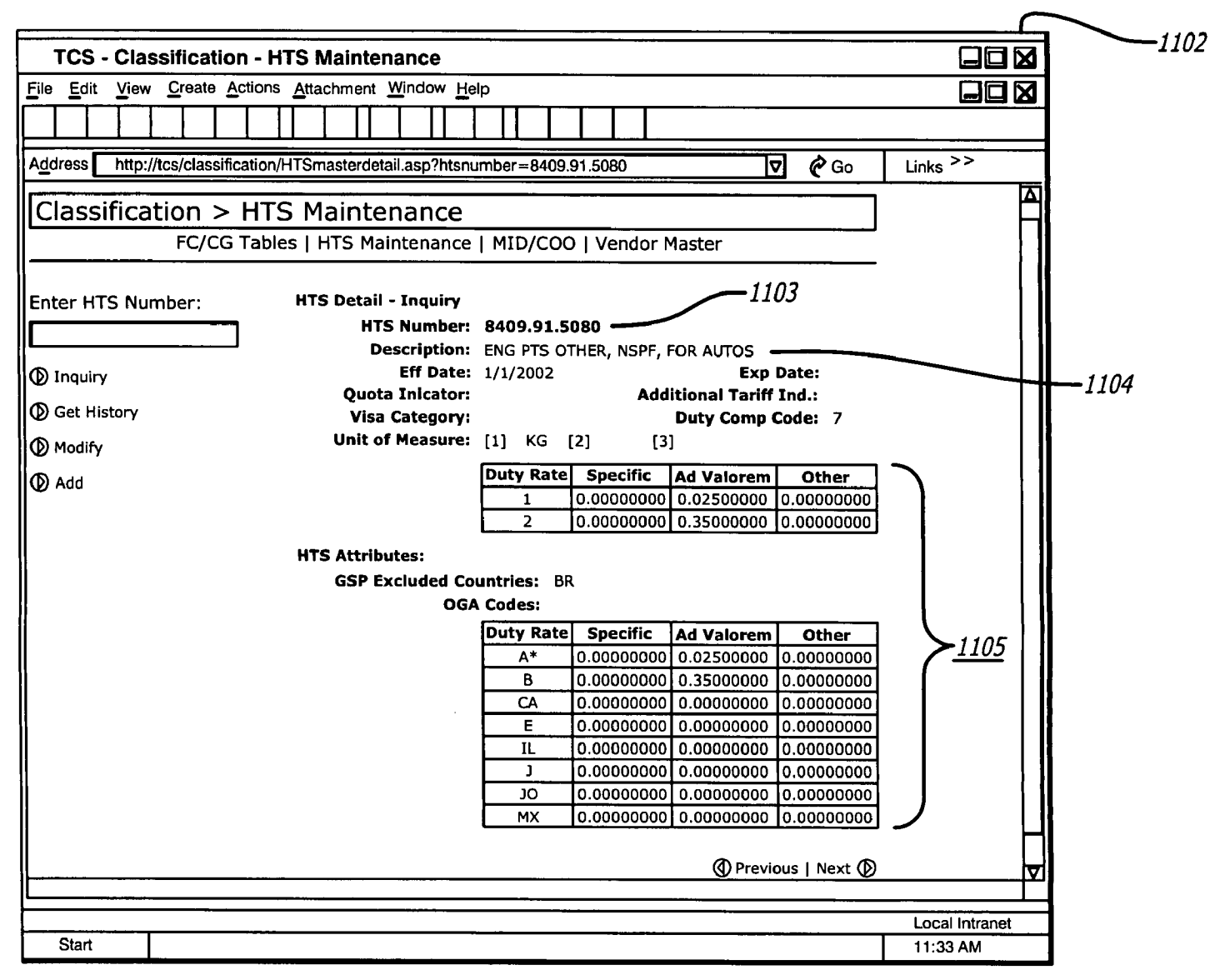

FIG. 11 represents a screen 1102 of an HTS classification. The screen is displayed in one embodiment by clicking on the HTS number 1001 from FIG. 10. The 10-digit HTS code 1103 may be displayed, along with a description 1104 of the item. Various additional information 1105 relating to the applicable duty rates and other attributes of the item may also be available in screen 1102.

The set of illustrative screens disclosed in FIGS. 7 through 11 reflect the benefits of the integrated TCS system and the ease of navigation for a user to locate and modify information relevant to the importation process. Navigational capabilities similar to the ones discussed above may be available for the different phases of the Customs compliance process (e.g., Classification, Entry, Post-Entry, and Amendments). In addition, cross-navigational capabilities may exist between the data repositories containing information relevant to the different phases. Different types of menus or screens, and a variety of navigational options, however, may be contemplated in other aspects without departing from the scope of the present disclosures.

Internal-to-Commodity Group Classification Map

In another aspect of the present disclosures, the corporation or business entity may introduce into the TCS a mapping of function codes to commodity groups to synchronize the corporation's "commodity group" classification system used for calculating tariffs with the corporation's internal business classification system, such as a system that classifies merchandise based on function codes. In this aspect, an internal-to-commodity group classification map may be used. Various companies may classify products they import into the United States in accordance with an internal classification system. This internal classification system may be used to classify parts and items for business purposes, for example, rather than for importation classification purposes. As an illustration, a company that has several divisions may include a division abroad that uses its own internal classification system to keep track of parts it purchases and sells.

Certain companies may employ a system that classifies parts based on the function of the part, or other criteria. For example, a particular division of a large corporation may classify products by an internal "Function Code" (see, for example, entry 1005 of FIG. 10). In this aspect of the present disclosures, a separate map may be created in a database that correlates each internal classification to its corresponding commodity group classification at the top of the decision tree. This map makes the TCS more robust and the cross-correlation of data makes it easier for the corporation to identify particular products and properly classify them. Internal classifications, whether they be by function, composition, or other criteria, may now be mapped in the TCS to classification groups related to Customs compliance. Among other benefits, this mapping obviates the need for a user to copiously search for products using the internal identifying criteria of a company and then to manually translate that criteria into a classification relevant to U.S. Customs.

In another embodiment, the map also may include a direct correlation between the internal classification and an HTS code. These mapping tools are invaluable in the pre-entry process for any business entity, and particularly for a sophisticated corporation with multiple divisions and different types of internal classification criteria and procedures.

The trade compliance analyst responsible for administrating the classification system accordingly has a new mechanism to facilitate classification of products. For example, in the instance where the internal classification system correlates parts based on their function, an analyst who is initially unsure as to which commodity group is applicable to a given product can now refer to the information in this internal classification system. The analyst may specify the function of the part, at which point the internal classification system may provide the analyst with details as to the part. Once the analyst identifies the correct internal classification of the part, the analyst can then simply consult the internal classification map for the commodity group classification that corresponds to that internal classification. As such, the analyst has an additional vehicle for classifying specific parts. Where the mapping directly links an internal classification to an HTS code, the analyst can simply consult the internal classification and assign the appropriate HTS code to the product at issue without further effort.

In other embodiments, and depending on a company's internal operating procedures, internal classification systems may provide information instead of or in addition to part function. A map can then be created that correlates these internal classifications (such as part composition, origin, etc.) to the top level commodity group. This linkage of data via the correlation map may provide a valuable resource to an employee responsible for classifying several of many different types of products associated with a business entity.

Figures 12, 13:
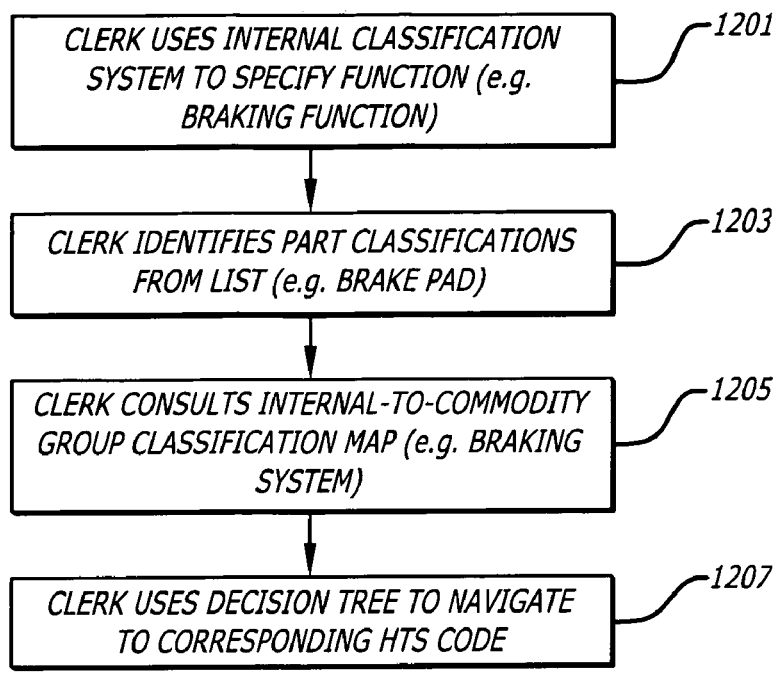
FIG. 12 is a flowchart of the use of an internal-to-commodity group classification map in accordance with an embodiment of the present disclosures.
FIG. 13 is an internal-to-commodity group/HTS code classification map in accordance with an embodiment of the present disclosures.

FIG. 12 shows an exemplary flowchart illustrating an internal-to-commodity group classification map. An analyst may log into the TCS or appropriate database and may specify a particular function (step 1201). For example, the analyst may be searching for a part related to a braking function for an automobile. Depending on the implementation of the TCS, the analyst may perform a query to identify this function, or the analyst may simply specify a particular function name or code. The database which contains the internal classification system may then provide the analyst with a list of part classifications corresponding to the specified function (step 1203). The analyst may identify the desired part classification from the list, such as a brake pad and its related information. Using the internal classification system, the analyst has now identified the specific part classification of interest. Next, the analyst may consult the internal-to-commodity group classification map to determine the commodity group classification that corresponds to the previously-ascertained internal classification (step 1205). An exemplary classification group may be a braking system. Knowing now the commodity group classification, the analyst may simply navigate through the decision tree to identify and assign to the part at issue the HTS code (step 1207). In other instances, as noted above, the mapping may relate to a feature other than function. Further, the mapping may be directly to an HTS code. A map may also link internal classifications to both commodity groups and HTS codes, depending on the selected internal classification.

The embodiment described in FIG. 12 provides the responsible corporate individual(s) with greater flexibility and more robust navigation options when searching for commodity groups and assigning correct HTS codes to parts or products.

FIG. 13 is a table illustrating an exemplary internal-to-commodity group/HTS code map in accordance with an embodiment of the present disclosures. The TCS may contain a repository of accessible information which includes an internal classification system 1301 mapped electronically to commodity group/HTS code classifications 1303. In the illustration where items are assigned different functions (or different function codes), the user has the flexibility of using the map to identify a particular function. That function in one embodiment may be associated with a series of parts. For example, "FUNCTION1" is associated with "PARTA1", "PARTA2", and "PARTA3." Similarly, "FUNCTION2" is associated with "PARTB1" and "PARTB2". "FUNCTION3" is associated with "PARTC1" and "PARTC2", and "FUNCTION4" is associated with "PARTD1". In other embodiments, a single function code may be associated with a single item.

A corresponding mapping 1305 may be made in the TCS between the function codes on one hand, and a commodity group (or HTS code) on the other hand. "PARTA1" (which may be a numerical value, a title, or a description, etc.) corresponds to commodity group labeled (for exemplary purposes) "GROUP1". "PARTA2" corresponds directly to a specific HTS code. "PARTA3" corresponds likewise to "GROUP1". Under "FUNCTION2", "PARTB1" and "PARTB2" both correspond to the commodity group labeled "GROUP3". "PARTC1" and "PARTC2" correspond to "GROUP4" and "GROUP5", respectively. Finally, "PARTD1" corresponds directly to an HTS code.

In other embodiments, mappings may be created within the TCS which link various internal classifications only to commodity groups, or only to HTS codes. FIG. 14 is an illustration of a database map wherein internal classifications based on function are all linked directly to HTS codes. "FCN1" corresponds here to three items, labeled for illustrative purposes "PARTA1", "PARTA2" and "PARTA3". These parts correspond, respectively, to 10-digit HTS codes "CODEA1", "CODEA2" and "CODEA3". Likewise, "FCN2" contains parts "PARTB1" and "PARTB2", which are linked respectively to "CODEA4" and "CODEA5". "FCN3" links to "PARTC1" and "PARTC2", which respectively map to "CODEA6" and "CODEA7". Finally, "FCN4" links to "PARTD1" which is mapped to HTS code "CODEA8".

Other arrangements may be contemplated whereby (i) internal classification systems other than or in addition to "function" are used, (ii) multiple linkages or mappings may be used based on multiple types of internal classifications (e.g., function, composition, country of origin, etc.), and (iii) maps may be made to commodity groups, HTS codes, or both. Whatever the embodiment, the end result is that the user may have a unique set of integrated tools to translate business classifications to meaningful Customs-relevant classifications. Using these tools, the analyst can more easily and efficiently classify items for tariff purposes in the pre-entry process.

As noted above, an importing corporation in one embodiment may have one or more domestic divisions, along with one or more divisions abroad. The corporate division(s) located abroad may have several internal parts classification systems used for business purposes. These classification systems may be distinct from the commodity group classification system employed by the domestic corporate division and used for computing import tariffs. Such classification systems for the various corporate divisions may involve the use of "function codes," item codes, parts based on particular categories, etc. This system is part of a corporate database and is used to associate particular parts, products or merchandise with a particular feature.

In the exemplary TCS system as described above using a corporate division located in the U.S. and another corporate division located abroad, the TCS system may permit seamless communication of necessary information for Customs compliance purposes. In one illustrative scenario, the domestic corporate division may periodically notify its corresponding division abroad with files containing information about parts requiring classification for importation purposes. The division abroad may use a web-based tool integrated with the TCS to access the transmitted information and to generate part descriptions and suggested import classifications. Similarly, the division abroad may periodically provide the domestic division with information or updates about its internal classifications. This information may then be introduced into the internal-to-commodity group/HTS code maps for use by the company in the importation process.

In the example above involving the two divisions of the corporation, the division abroad examines the information regarding part classifications transmitted from the domestic corporate division. The division abroad may thereupon extract various information from the tariff-related portion of the TCS, such as part number, HTS code, commodity group, part description, etc. The appropriate information is then provided for each part and a new file may be created by the division abroad. These new files may then be transmitted back to the domestic corporate division via the GIFT interface discussed above, or through another appropriate and preferably secure interface. When the domestic division of the corporation receives these files from the division abroad, the domestic division may load them into a specific database within the TCS. The new files may be appropriately labeled and integrated, as necessary, within the database repositories of the TCS. Links may then be established to various fields within these files in order to enable an analyst to access this information and cross-reference it with other information.

At this point, Customs personnel appointed by the domestic division can perform an audit of the abroad division's suggested classifications. In one embodiment, for each part, an analyst uses various applications integrated in the TCS to make an independent determination as to the correct HTS code. If the HTS code determined by the analyst differs from that supplied by the division abroad, the HTS code determined by the analyst is used. Ordinarily, an assistant manager or other higher level employee or assignee may review the classification and supporting data, and may enter any necessary changes into the TCS database. At this point, after the analyst's initial entry, after the abroad division has transmitted any necessary information, and after the classification has been reviewed by an appropriate personnel, the part's classification may now be considered "finalized."

In other embodiments, the division abroad may have no role in performing product classifications for tariff purposes. Such examples may include situations where items other than service parts are designated for import into the United States. These items may include, for example, non-service replacement parts, automobiles, motorcycles, and power equipment. The specific implementation of the TCS is dependent on the structure, function, geographical location, and product offerings of the importing business entity and other criteria, and may differ widely without departing from the scope of the present disclosures.

The Entry Process

After the classification step is completed, the corporation may then transmit the relevant information pertaining to the parts for importation to customs brokers and other entities. In the case of a corporation with divisions in both domestic locations and locations abroad, the domestic division may transmit the finalized information to the division(s) abroad. The updated information is maintained in the databases within the TCS.

In addition, finalized classifications may be transmitted to designated customs brokers. The classifications may include files that contain basic classification information, product attribute information, and other necessary information for the customs broker to prepare the applicable paperwork for the shipment(s) designated for importation.

The next step in the process may relate to activities conducted by the customs brokers and the corporation to ensure compliance with U.S. Customs regulations. Generally, customs brokers are individuals appointed to submit customs entries on behalf of the importing corporation to U.S. Customs. These customs entries may be stored in the TCS for use in connection with various "post-entry" activities. Related data may be included with these customs entries, including information regarding foreign vendors and other manufactures, etc.

Figure 15:
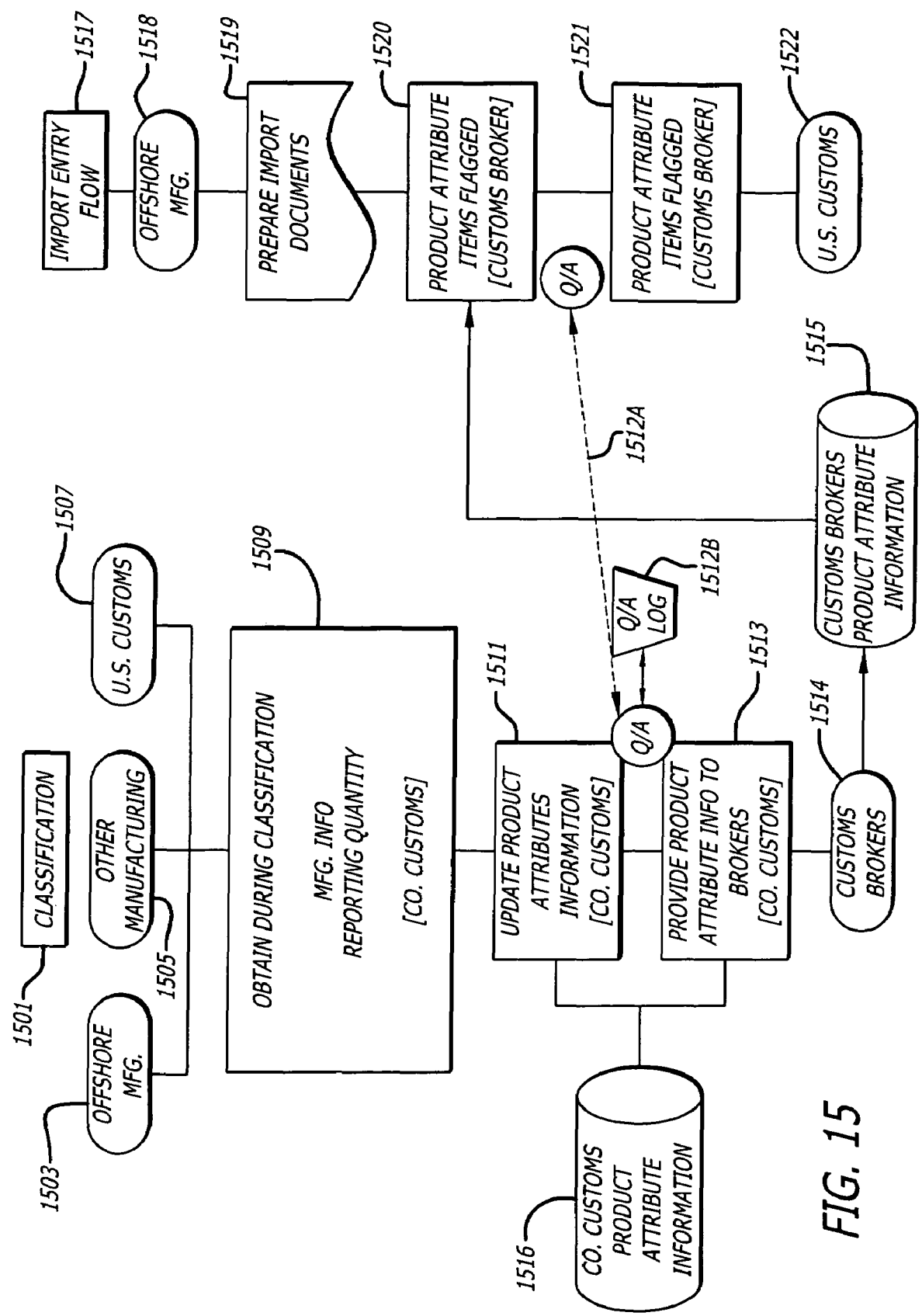
FIG. 15 is a flowchart showing classification and import entry procedures in accordance with an embodiment of the present disclosures.

FIG. 15 shows an illustrative flowchart of the classification process followed by the entry process using the TCS. During the entry process, the customs broker may tender relevant information to U.S. Customs concerning an imported shipment. During initial classification 1501 as discussed at length above, the importer in this embodiment may gather product attribute information from the manufacturer. For example, in step 1509, the importer may obtain information regarding product classification from offshore manufacturers 1503, other manufacturers 1505, and U.S. Customs 1507. "Co. Customs" (such as a division of the importer responsible for importation procedures) may use this information to update product attributes in the TCS repositories 1516 as discussed in greater detail earlier in this disclosure (step 1511). Next, the "Co. Customs" division of the importer may provide all product attribute information to the customs brokers 1514 prior to shipment (step 1513). In one embodiment, this information is provided to the customs broker on a daily basis (e.g., via the product dictionary in the TCS). The customs brokers may update their local systems with this product attribute information (step 1515).

Next, the import entry process flow 1517 is described. In addition to product attribute information 1515, the customs broker obtains any necessary information concerning a shipment to be imported from offshore manufacturers (1518) and other entities with relevant information. The customs broker may thereby prepare import documents 1519, as discussed at greater length in connection with FIG. 16 below. At the time of entry of the shipment into the United States, the customs brokers may flag and reference the product attribute information (HTS codes, NAFTA certificates, countervailing duties, etc.) that is supplied by the importer and that corresponds to the contents of the shipment (1520). In the instance where relevant product attribute information is missing or the customs broker is unclear about some issue relating to classification, the customs brokers may notify "Co. Customs", and a "Question and Answer session" 1512A may ensue. The information received from and supplied to the customs broker during this process may be recorded into a Q/A log 1512B in the TCS. The customs broker may next complete the entry process by supplying U.S. Customs 1522 with the appropriate forms and paying the applicable duty (1521).

Harmonized Tariff Schedule Classification Audit Using Entry Data

In another aspect of the teachings herein, an HTS Classification audit may be performed using entry data. A customs broker working for the importer may receive information about a specific shipment from the importer, a supplier of the importer, a freight forwarder, or another entity. The customs broker is relegated with the responsibility of preparing the appropriate documentation for presentation to U.S. Customs on behalf of the importer. The collection of documentation that the customs broker prepares is called an entry packet. The actual contents of the entry packet may vary depending on the type and origin of the shipment(s) (among other factors). Generally, however, the entry packet contains a Customs 7501 form for declaring applicable duties, a commercial invoice describing the products being shipped, and a shipping manifest which indicates shipping information such as the port of origin. The shipping manifest may also embody a bill of lading, or in some instances a separate bill of lading may be included.

In one embodiment, the customs broker consults the Item Master, also known as the product dictionary, to determine which HTS codes apply to the products in the shipment at issue. Thus, while the importer assigns appropriate HTS codes to imported products in the entry process, the broker may use those classification assignments in determining the tariffs to be paid. The broker may use the product dictionary to apply existing HTS assignments to shipments. In one embodiment, an "HTS code" field is available for each product in the Item Master repository. If the broker cannot find the relevant HTS code in the product dictionary, the broker generally must call the importer to ascertain the correct HTS code. For example, when product attribute information is missing, customs brokers may tender requests to the importer. The importer, in turn, may provide the appropriate answers, and logs the information provided into the TCS.

The broker may also assign what are known as "attribute classifications." Attribute classifications are classifications of other relevant attributes relating to the imported products. Such attributes may include, for example, classifications relating to NAFTA certificates, and FM and Department of Transportation restrictions. These attribute classifications may subject the items to additional or different tariffs. The customs broker may report these classifications to U.S. Customs and pay duties based upon this report. In addition, certain HTS codes may be subject to various other qualifications relevant to the entry packet, such as any anti-dumping or countervailing classification related to a product. Generally, the broker has its own book or database of relevant HTS classifications from which it can ascertain whether or not specific attribute classifications apply to a particular item. In other instances, the broker may be aware that products have special attributes simply by the broker's general knowledge in the industry.

In one embodiment, a database containing all of these broker assignments may be received from the broker and electronically and methodically compared with an internal product database of similar information created and maintained by the importer. A report of inconsistencies may then be generated, and U.S. Customs may be notified of any discrepancies. A broker may submit an entry packet it prepared to U.S. Customs. Concurrently or shortly thereafter, the broker may submit the report electronically to the importer. The importer may then consult its Item Master and/or other internal records for comparison purposes and to verify the accuracy of the submitted entry packet. Where discrepancies are found, the importer typically can submit an amended entry packet to U.S. Customs within ten (10) days of the submission of the initial incorrect entry packet. Should this occur, the amended entry packet simply supercedes the earlier entry packet. Where, on the other hand, a discrepancy or error is found after the ten day window allotted by Customs, an official amendment may be prepared and submitted to Customs containing the corrected information and any bases for the discrepancy(ies).

FIG. 16 shows a flowchart describing the HTS classification audit using entry data. At step 1601, the broker prepares records, typically in the form of entry packets, which may constitute the documentation supporting the amounts to be paid on a given shipment or set of shipments. The broker may then submit the entry packet report to U.S. Customs as the items are imported into the country, and may pay the applicable duty (step 1603). Thereupon, the broker may scan the entry packet into an electronic format and submit it electronically to the importer (step 1605) for entry in the TCS (step 1607). The importer may then compare the entry packet prepared and submitted by the broker with its own internal records (step 1609). In one embodiment, the importer consults its internal Item Master to ensure that no discrepancies exist between the broker's entry packet and the information in the Item Master. Should discrepancies exist, an inconsistency report may be generated and, depending on the time of importation, an amended entry packet with the corrected data may be generated (step 1611). The importer may then notify U.S. Customs of the discrepancies by, for example, submitting the amended entry packet (step 1613).

Figure 17:
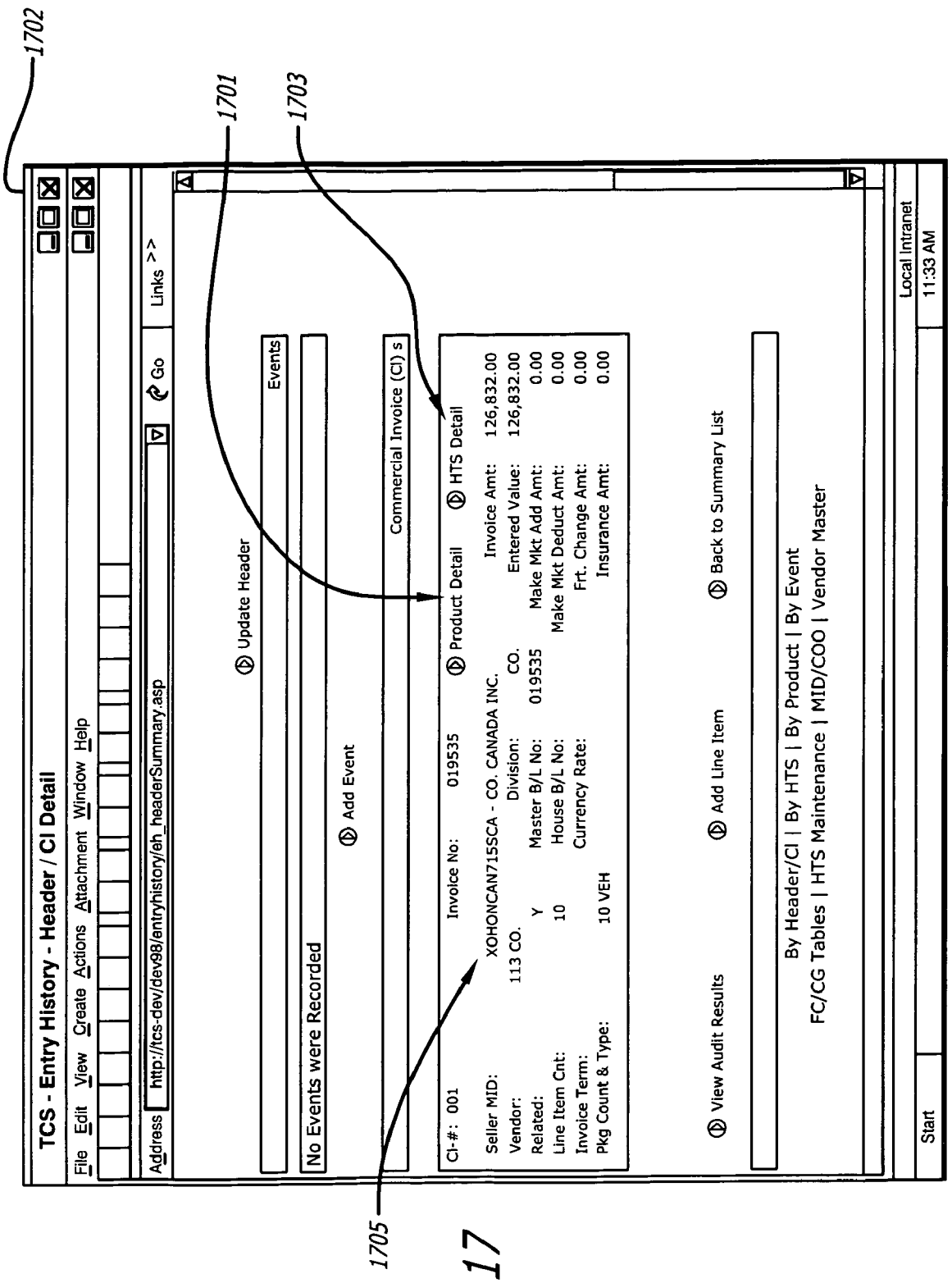
FIG. 17 is another screen of the TCS for accessing entry history in accordance with an embodiment of the present disclosures.

FIG. 17 is an illustration of a screen 1702 used for accessing the Item Master in performing an audit using entry data. The example shows a product having an invoice number XOHONCAN715SCA (1705). In this embodiment, the user may view classification information regarding this part by clicking on the invoice number. The user can also view details about the specific product in question by clicking on the "Product Detail" link 1701. The user may also determine the corresponding HTS code of the product by clicking on "HTS detail" 1703. Using these navigational features, the user can examine the entry packet submitted electronically by the customs broker and compare it to the relevant fields in the Item Master to flag any errors or inconsistencies.

FIG. 18 shows another example of a screen 1802 that can be accessed by selecting the "HTS Detail" link 1703 in FIG. 17. FIG. 18 also illustrates the utility of the TCS by its advanced navigational capabilities and its user-friendly applications screens. These screens may be part of an integrated application which overlaps and links to the underlying database repositories which provide for uniform and easy access to and editing of information pertinent to U.S. Customs. Here, the HTS code 1804 of the selected product can be identified and readily compared with the information in the entry packet submitted by the customs broker to U.S Customs. Further, the screen 1802 provides information about any necessary product attributes (if applicable), such as whether an anti-dumping duty 1805 or a countervailing duty 1806 may apply to items in the shipment. These records can be quickly and easily compared with the information in the electronic entry packet provided by the customs broker. Any errors can thereby be identified and appropriate remedial measures may be taken.

Customs Duty Audit Using Post-Entry Data

In another aspect of the teachings herein, a customs post-entry audit technique is disclosed. For various reasons, the information reported by a customs broker to U.S. Customs is sometimes determined in retrospect to be inaccurate. This determination may be made after the goods have been imported into the United States. Reasons for inaccuracy may include, for example, incorrect or incomplete documentation pertaining to imported products, inadvertent errors, and the like. In certain instances, the inaccuracies may not be detected in the entry-audit discussed above. For example, information provided by the receiver of the goods that is received after entry into the United States may reflect errors in the documentation of the importer or customs broker.

These inaccuracies need to be addressed and fixed in a more efficient and reliable manner than exists in present systems. The TCS may address the present deficiencies in the art by providing an audit mechanism using post-entry data. Post-entry data may include not just information in the product dictionary, but also information received by the importer from the receiver of the shipment after its entry into the United States, among other entities. Based on this collection of post-entry information, for example, the importer may determine that the number of items actually imported into the United States is different from the number of items declared on the Customs 7501 form by the customs broker. A shortage or overage of duties paid may be determined, and appropriate adjustments can thereby be generated and submitted to U.S. Customs. In accordance with the present disclosures, an integrated method for post-entry audits can be performed efficiently and accurately using the TCS system.

In one embodiment, a broker database of the information reported by the customs broker to U.S. Customs is electronically delivered by the customs broker to the importer. Meanwhile, the importer may create a database of post-entry information pertaining to products after they enter the port, such as the actual number of units that is received, the actual price paid for the product, the actual value of the product, and other relevant information. The importer may input this information into the repositories of the TCS. The broker database may then be electronically and comprehensively compared to the importer's database of information. Using the TCS, inconsistencies may be identified, a report of any necessary adjustments may be made, and adjustment notices may be generated by the importer via the TCS and delivered to U.S. Customs.

The database of post-entry information may also track royalty payments that the importer makes to third parties for use of third party intellectual property in the importer's products. These payments may be used to offset the valuation of the products that originally served as the basis for determining the duty that was paid.

Figure 19:
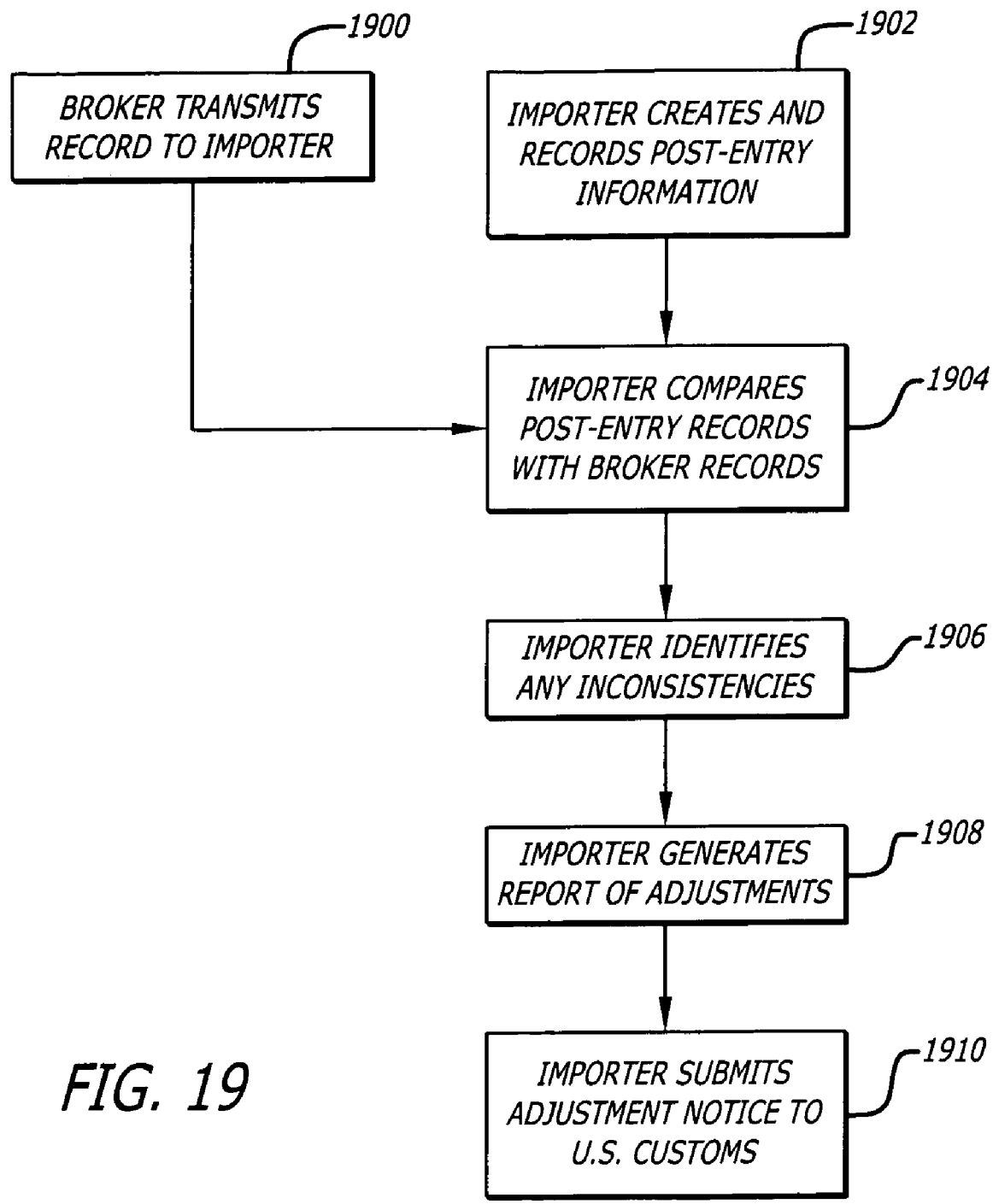
FIG. 19 is a flowchart of a customs duty audit using post-entry data in accordance with an embodiment of the present disclosures.

FIG. 19 is a flowchart depicting the post-entry audit method in accordance with an embodiment of the present disclosures. After the customs broker submits the entry packet to U.S. Customs, it may scan the entry packet records as an electronic image and transmit the image to the importer (step 1900). Meanwhile, the importer may create and record any relevant post-entry information, such as information obtained from the receiver of the imported goods, or information from other sources (step 1902). The importer may then compare the post-entry information contained in the TCS with the electronic entry packet records provided by the customs broker (step 1904). The importer may identify any inconsistencies or discrepancies in the tariff actually paid versus the tariff that should have been paid based on post-entry information (step 1906). The importer next generates, if necessary, a report of adjustments and may input that report into the TCS (step 1908). Finally, the importer submits a formal amendment to U.S. Customs reflecting the discrepancy and identifying the appropriate adjustments (e.g., an overpaid tariff) (step 1910).

Figure 20:
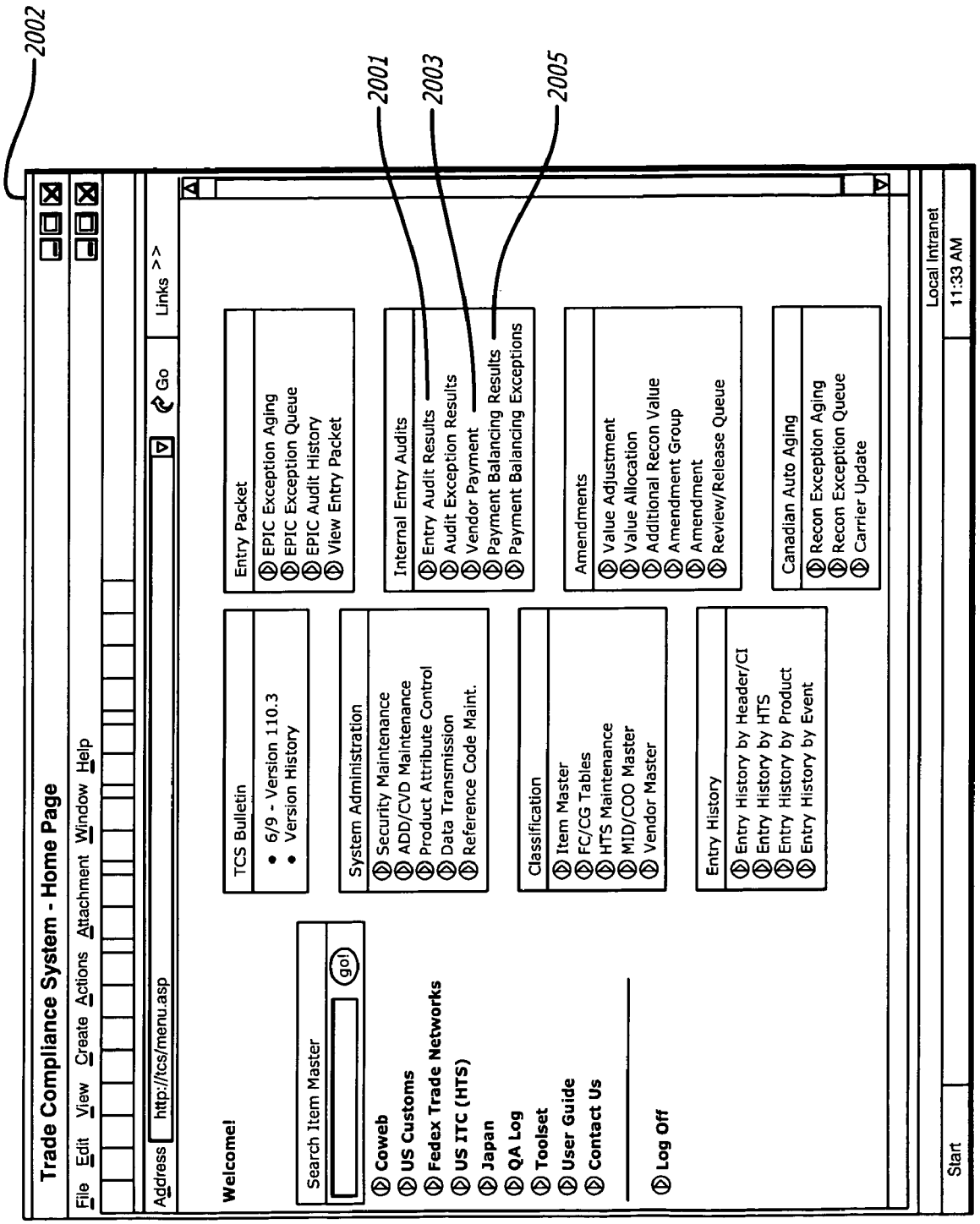
FIG. 20 is a screen of the TCS and associated entry audit links for performing post-entry procedures in accordance with an embodiment of the present disclosures.

FIG. 20 shows another example of a main menu 2002 of the TCS application in accordance with an embodiment of the present disclosures. The main menu 2002 may have integrated features and links that further reflect the efficient navigational capabilities of the present disclosures and that enable efficient post-entry audits. As noted previously, the main menu 2002 may allow users to access the TCS on-line and other selected links to other Customs Web sites and tools. The "Entry Audit Results" link 2001 may provide post-entry workflow navigation linkages for examining entry audits results and exceptions. Using the "Vendor Payment" link 2003, users may review vendor payment records. Users may also review, using the "Payment Balancing Results" link 2005, balancing results and exceptions. All of these features may be useful in various facets of the post-entry process.

Figure 20A:
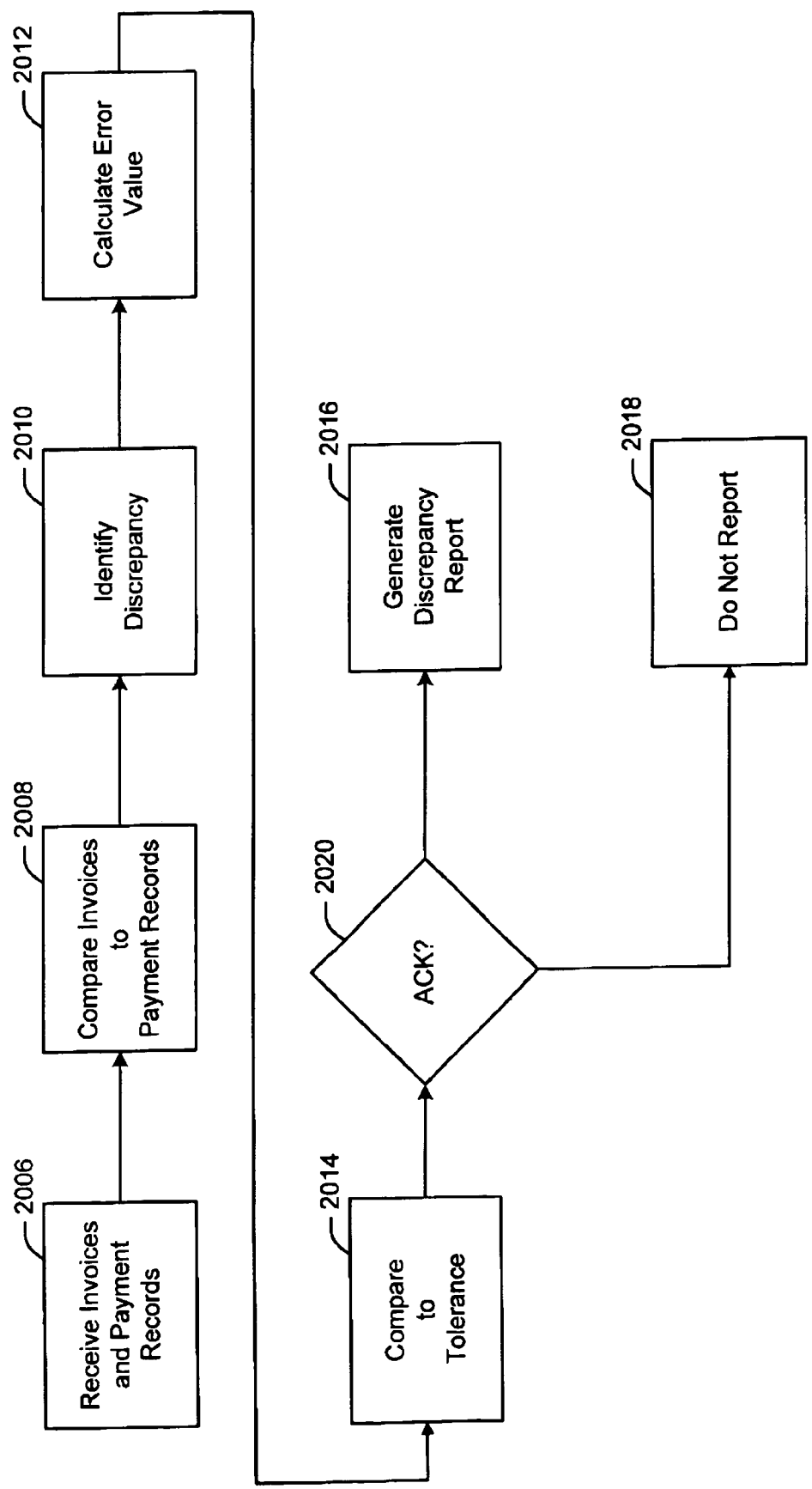
FIG. 20A is a flow chart illustrating post-entry audit procedures that may be invoked when a user activates an Audit link in FIG. 20.

FIG. 20A is a flow chart illustrating post-entry audit procedures that may be invoked when a user activates the Audit link 2001 in FIG. 20. Once the Audit link 2001 is activated, the TCS may perform a method of auditing invoice and payment records within the TCS, to detect errors within the data stored in the system. As explained above, the TCS stores a plurality of invoices and payment records, each of which may come from different sources. At block 2006, a plurality of invoices and a plurality of payment records are received by the TCS. During a post-entry audit, the system may compare common attributes between an invoice and payment record for a shipment of goods, in order to detect a discrepancy between the two. This is indicated at block 2008. While certain discrepancies may be insignificant so as to not warrant concern, larger discrepancies may require record editing and/or amendment processing. Thus, the TCS may include predetermined tolerance values that detected discrepancies may be measured against.

For example, business rules or U.S. Customs rules may require editing for discrepancies over a certain dollar amount. Discrepancies smaller than that amount may not warrant the time and associated costs encountered by editing and amending. Thus, a tolerance may be keyed into the TCS, so that only discrepancies larger than that amount are triggered as exceptions or reported to the user as discrepancies. Once the system identifies a discrepancy of any amount at block 2010, it may calculate an error value for the discrepancy at block 1012, then compare the error value to the predetermined tolerance value at block 1014 in order to determine whether the discrepancy warrants an exception. An error value may comprise, for example, a dollar amount representing the difference in value reported between an invoice and a payment record. If the error value exceeds the tolerance value, a report identifying the particular discrepancy may be generated, at block 2016. The predetermined tolerance value may be variable, such that as business rules or U.S. Customs requirements change, the value of the tolerance variable may be changed and applied globally throughout the system.

TCS records may be edited and amendments may be generated when a discrepancy report issues. The amendments may be forwarded to U.S. Customs per its requirements. Alternatively, if the reported discrepancy falls outside of a tolerance dictated by internal business logic but is within a tolerance dictated by U.S. Customs (i.e. does not violate the U.S. Customs requirement for amendments), an amendment need not be generated. Thus, a user may provide input to the TCS acknowledging the error but declining to generate an official amendment. The TCS may then, in response to receiving the acknowledgement, decline to generate discrepancy reports at block 2018 for subsequent discrepancies that are detected but do not fall outside of the U.S. Customs tolerance. In order to determine whether or not to generate a discrepancy report, the system may determine at decision block 2020 whether an acknowledgement for the particular discrepancy or type of discrepancy has been received. In addition, The TCS may automatically detect patterns in discrepancies, and report these patterns to a user. For example, the TCS may detect that a group of discrepancy reports shares a common attribute, such as the same subject product. The TCS may then generate a report indicating this pattern, namely that a particular product is experiencing audit discrepancies in its TCS entries. A user may then study these reports to determine the product-related problem and discover, for example, that the product has been assigned an improper HTS code resulting in incorrect duty calculations. In this manner, many audit reports may be handled at once by a user.

The TCS may also keep audit records or audit trails for future reference. In addition to storing records of audit occurrences, an audit record may also have associated with it the tolerance value used during that audit. Because tolerance values are applied as a variable and may change with time, the audit record memorializes the value of a tolerance used in a particular audit, so that future reference to the audit may be made in the context of requirements in place at the time of that audit.

FIG. 21 is a screen illustrating the post-entry audit capabilities of the TCS in accordance with an embodiment of the present disclosures. Screen 2102 of FIG. 21 is an exemplary page that is displayed by virtue of a user clicking on the "Entry Audit Results" link 2001 in FIG. 20. In this embodiment, the TCS screen contains a headline logo ("Trade Compliance System") followed by navigation commands to all functions (e.g., "Home", "Audit Exceptions", etc.) (2101). The "Audit Results Summary" section 2107 may allow the user to enter an Entry Number 2105 and view the internal audit results. In this example, a user keyed the displayed entry number and pressed the "Inquire" command 2103 to execute the search. The resulting screen shows both summary results and audit exceptions (2107). This example displays different audit group summary results. The user may scroll down to the audit exceptions section to view detailed errors (see FIG. 22).

FIG. 22 shows a screen 2202 containing an "Audit Exceptions" summary 2209 as selected from the links available in FIG. 21. The "Audit Exceptions" summary 2209 show the detailed audit errors discovered in the post-entry audit process. The user can decide which errors to correct. The users may have various navigation links to use during problem determination analysis. For example, the "Invoice Number" link 2201 may enable the user to navigate back to an "Entry History Header Detail" screen. The "Item ID" 2203 may link the user to the same screen. The "Line#" link 2205 may permit the user to navigate to the "Entry History Product Detail" screen. Further, links 2207 allow the user to return to a "Change Criteria" or "View Audit Exceptions by Audit Group For This Entry" screen.

FIG. 23 shows another screen 2302 that is generated in this implementation by clicking on the "View Audit Exceptions" link 2207 in FIG. 22. As this example illustrates, the TCS of the present disclosures may provide the user with a plethora of sort sequences of the same information to enhance and render more efficient the post-entry problem analysis process. The exemplary entry 2301 provides a plurality of navigation links to detailed information on other screens. For example, included on this screen are links to "Entry History Detail", "Commercial Invoice Detail", "Line Item Detail", and "Item Master Detail." The user thus has a comprehensive set of linked tools for identifying errors and solving audit-related problems. Further, as shown by icon 2303, the user may also navigate back to "Entry Audit Results" simply by clicking on that link.

In short, the TCS may dramatically streamline the otherwise cumbersome process of post-entry audits. The user may have a number of links from which to choose. The user may enter or change information, which entries are recorded into the data repositories and available for subsequent viewing by another user. The navigational capabilities of the TCS may provide the maximum available tools for a user to identify and isolate audit exceptions for performing subsequent remedial measures.

In another embodiment, an analyst may also utilize a "value adjustments" function in the TCS. This function retrieves debit/credit adjustments from an accounts payable system that contains the quantity overages and shortages from the importer's vendors. The analyst may then use an "Amendments" function to make adjustment to the importer's entries and to report the value and quantity discrepancies to U.S. Customs through the Amendments process.

Linking Customs Entry Packets to Electronic Entries

In another aspect of the teachings herein, a method for linking customs entry packets to electronic entries is disclosed. As discussed at length above, the customs broker often submits entry information to U.S. Customs in the form of entry packets. Each entry packet typically includes 7501 forms and commercial invoices with duty amounts and bills of lading. The broker may also deliver a text file called an "electronic entry" to the importer on a periodic basis. The file may incorporate the entry packet and identify each incoming shipment in a header (including the ID of the shipper, the total value of the shipment, and the total duty paid). Under each header may be a series of records. Each record may identify each item in each shipment.

The customs broker may scan the entry packets and send image files of each entry packet electronically to the importer on a periodic basis. The importer may store this image data in a database and link each shipment in the electronic entry file to the image of its associated entry packet.

Figure 24:
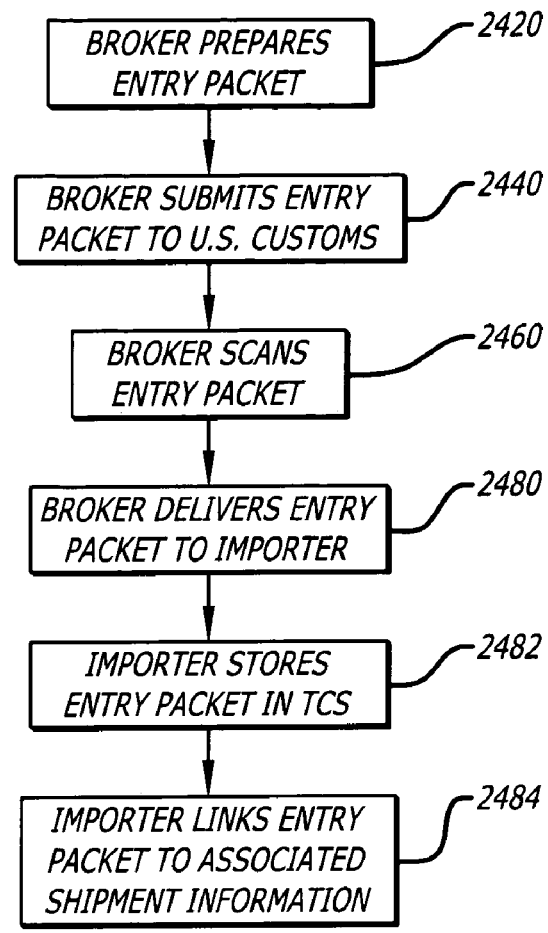
FIG. 24 is a flowchart of a method for linking entry packets to electronic entries in accordance with an embodiment of the present disclosures.

FIG. 24 is a flowchart of the electronic linking process in accordance with an embodiment of the present disclosures. In step 2420, the customs broker prepares an entry packet. The customs broker then submits that entry packet to U.S. Customs (step 2440). The broker may also scan the entry packet into an electronic file or series of files (step 2460). Thereupon, the broker delivers the electronic entry packet to the importer (step 2480). Using the integrated capabilities of the TCS, the importer can store the entry packet in an associated repository (step 2482). Next, the importer may link electronically the entry packet file to associated shipment information maintained, received, and/or generated by the importer (step 2484). In other embodiments, and depending on the TCS configuration, the importer may link other or additional types of information to the entry packet file.

The ability to link electronic entry packet to associated shipment information again streamlines the process of efficient record-keeping and accurate auditing. Because the files are linked together, the user no longer needs to perform arbitrary searches to ascertain information about a particular shipment. The user can simply select the associated shipment or entry packet. The user can then examine the underlying information associated with and linked to the shipment at issue by navigating from one set of records to its linked counterpart. As a result, both the record-keeping and the auditing processes are made much easier and more efficient. In addition, the TCS maintains a logically-integrated set of information, rather than a mere conglomeration of data from which the user must arbitrarily perform inquiries until he or she can find the requested information for the operation at issue.

Figure 25:
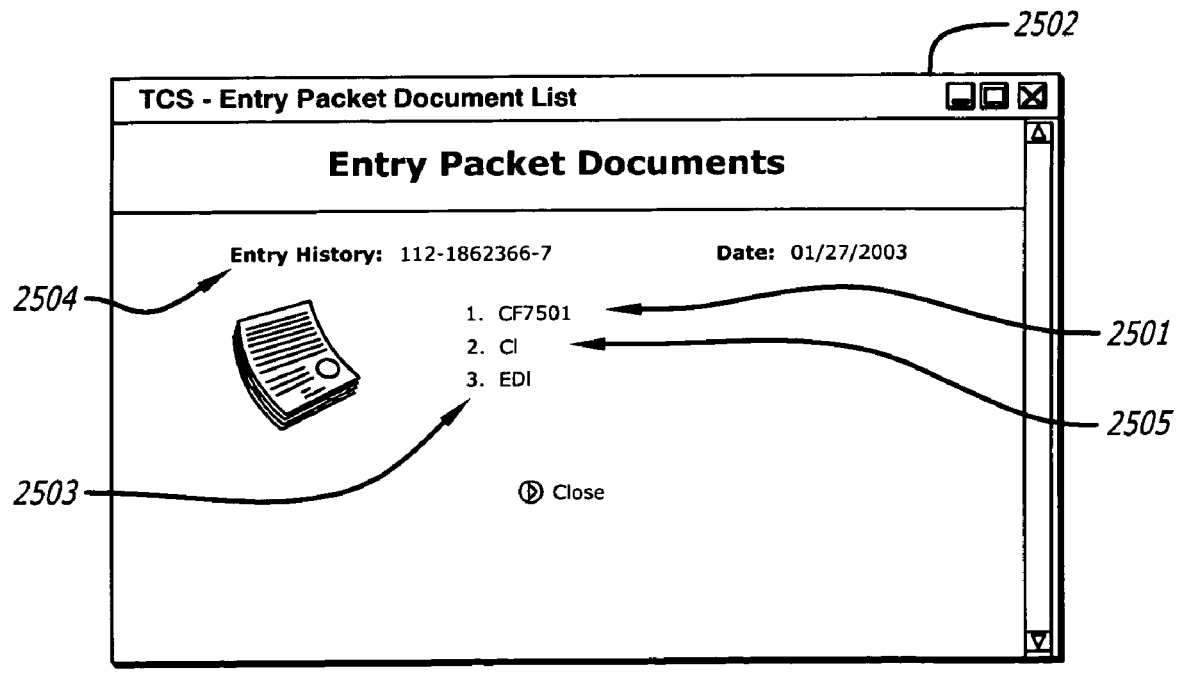
FIG. 25 is another screen of the TCS showing entry packet documents in accordance with an embodiment of the present disclosures.
Figure 26:
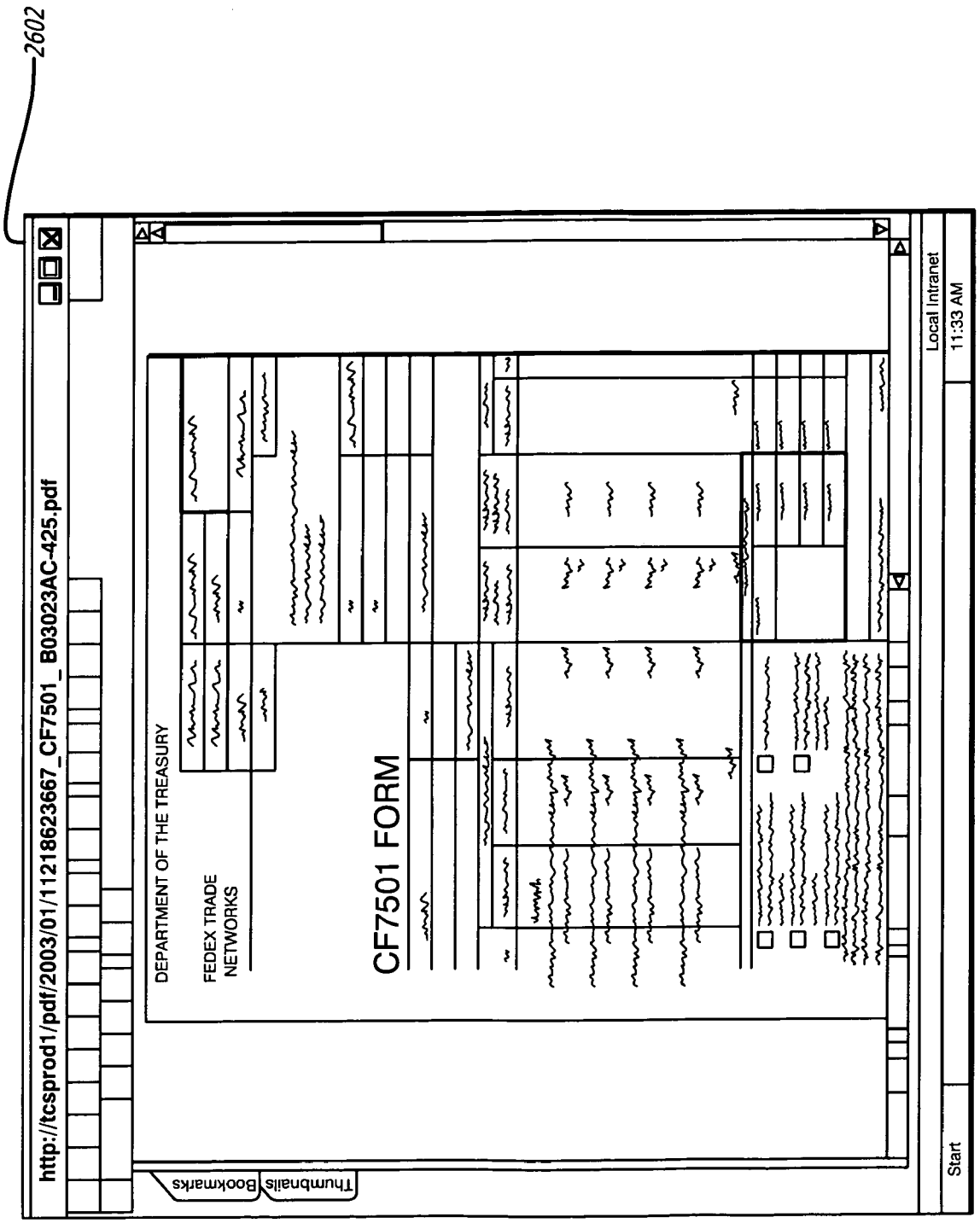
FIG. 26 is an electronic CF7501 Customs Entry summary document in accordance with an embodiment of the present disclosures.

FIG. 25 shows an example of a TCS screen 2502 containing links to the electronically recorded entry packet information. In this example, an "Entry History" number 2504 is assigned to the entry packet for subsequent identification purposes. The entry packet shown has three elements. The user may navigate to the CF7501 Customs form by clicking on the link 2501. The user may also access directly the Commercial Invoice of the shipment associated with the entry packet by simply clicking on the link 2502. The user may also navigate to the EDI by selecting link 2503. The entry packet may be linked in other embodiments to additional information. An illustration of the 7501 form related to the entry packet is shown in the screen 2602 of FIG. 26.

Figure 27:
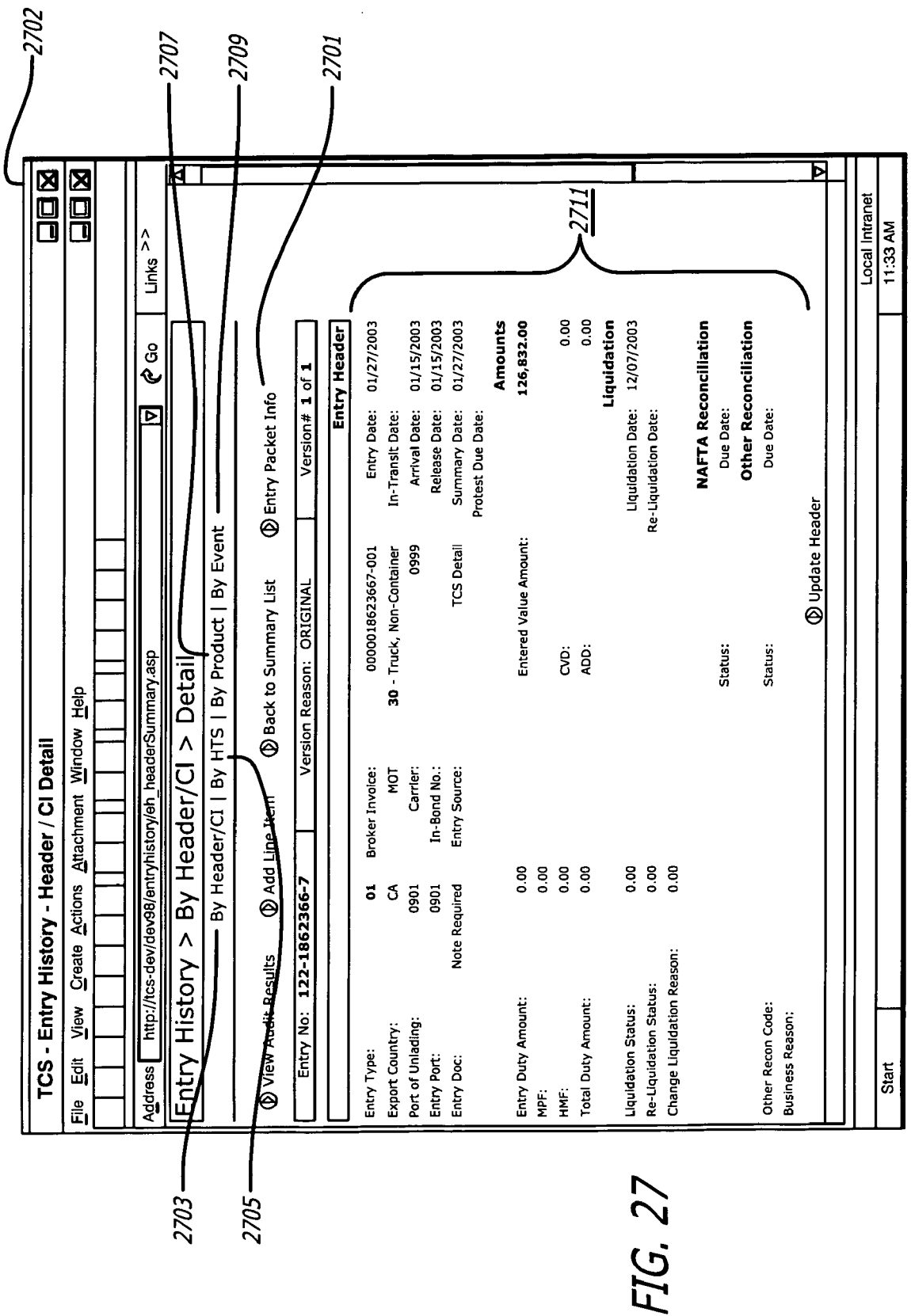
FIG. 27 is another screen of the TCS for providing entry history information in accordance with an embodiment of the present disclosures.

FIG. 27 shows an screen illustrating the utility of linking entry packets to shipment information in accordance with an embodiment of the present disclosures. The TCS screen 2702 in this embodiment provides the user with the ability to navigate to various desired aspects of a particular shipment. "Entry Packet Info" link 2701 may allow the user to navigate back to the entry packet screen 2502 in FIG. 25. The user may also examine information regarding the shipment(s) at issue based on criteria including "Header/Cl" (2703), "HTS" (2705), "Product" (2707), and "Event" (2709). The user is also provided in this embodiment with a comprehensive list 2711 of information linked to and directly relevant to the entry packet at issue. From this description, the advantages associated with the linkage of information are readily apparent. Audit times may be decreased. Records may be more easily found. Shipments may be examined using a variety of criteria.

Two-Pass Harmonized Tariff Schedule Classification System

In another aspect of the teachings herein, a Two-Pass HTS classification system is disclosed. The classification process involves, among other things, a review and accurate understanding of pertinent rulings issued by U.S. Customs. As a result of these complexities, the classification process can often require a level of skill higher than that posses by some analysts. Accordingly, in one embodiment, the TCS uses a two-pass classification process. In particular, a classification analyst may preliminarily classify each product by comparing information about each product with information concerning the HTS codes, such as by using the available tools and references discussed earlier in this disclosure. As a first pass, however, the analyst may simply classify products by considering the relevant HTS codes without considering U.S. Customs rulings or other specialized information potentially relevant to the classification process. The analyst may store these classifications in a repository in the TCS database, along with explanations for the classification, each known as the "basis for classification."

Subsequently, the information in the repository input by the analyst may be reviewed during a second pass by other personnel. The second personnel can review the information in the database for accuracy and consistency, this time taking into consideration other bases for classification. Such other bases may include information provided by other divisions, pertinent U.S. Customs rulings, attribute classifications, and other specialized information. The second personnel may then correct any errors or inconsistencies in the database. Using the two-pass method, an analyst can perform an overall classification of products at an efficient pace, while another more qualified personnel can review the analyst's work by entering into the TCS system and exploring the analyst's classifications in light of Customs rulings and other criteria. This process helps ensure greater accuracy of classification results while maintaining efficiency. The integrated capabilities of the TCS system, which enables multiple users to access relevant database, renders the two-pass system particularly efficient.

Figure 28:
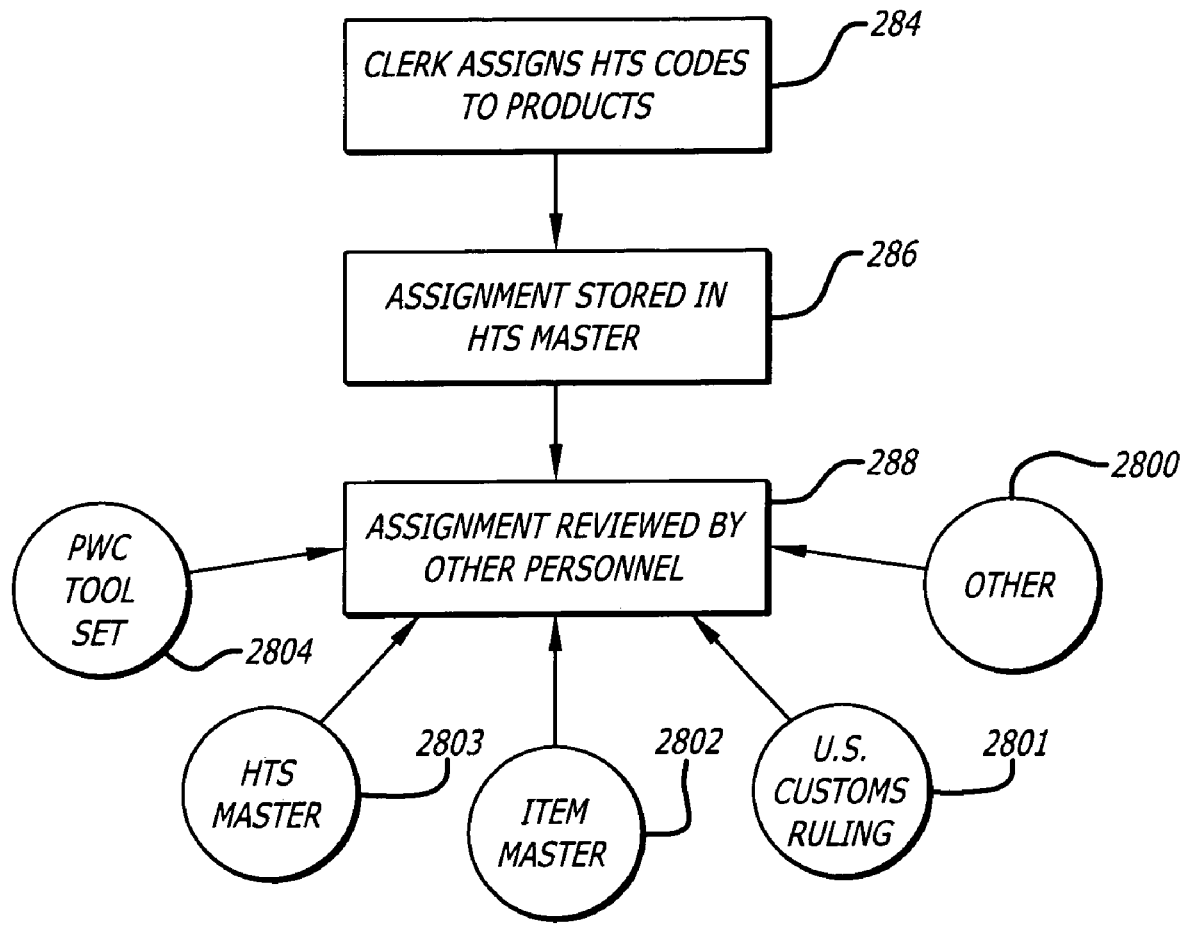
FIG. 28 is a flowchart showing a method for two-pass HTS classification in accordance with an embodiment of the present disclosures.

FIG. 28 depicts a flowchart of the two-pass classification process. In step 284, an analyst may enter the TCS system and, using the tools at his disposal as discussed above, may assign HTS codes to the products at issue. At step 286, the analyst stores these assignments in a data repository in the TCS. Thereafter, at step 288, the classification assignments made by the analyst may be reviewed by other personnel. The other personnel may use a variety of tools in reviewing the assignments and corresponding "bases for classification" made by the analyst. For example, the reviewing personnel may consult the PWC tool set 2804, the HTS Master 2803, the Item Master 2802, applicable U.S. Customs Rulings and regulations 2801, or other relevant criteria 2800.

Electronic Reimbursement of Customs Broker

A customs broker ordinarily pays the duty for the importer with respect to a particular shipment. The broker thereafter transmits invoices to the importer seeking reimbursement. Reimbursement can take a significant amount of time due to, among other things, the time-consuming nature of entering data from broker invoices. The importer's approval and payment process injects additional delays into the mix.

Accordingly, in another aspect of the present disclosures, the TCS speeds up the process of reimbursing the customs broker for duties that he has paid on behalf of the importer. In particular, the TCS provides an automated, electronic reimbursement system. Instead of receiving reimbursement invoices in the form of copious paperwork, the invoices in one embodiment are sent and received electronically. Using the integrated capabilities of the TCS and its multi-faceted search and retrieve functionality, an analyst may then link the electronic invoices to the applicable underlying documentation. Such underlying documentation may include, for example, images of the entry packet submitted on behalf of the shipment at issue, the broker's invoice or breakdown of expenses, and other information. All of this documentation, including the electronic invoice of the broker, may then be reviewed and approved on-line, with links to related documentation available so that any questions can be answered and any discrepancies can be quickly and authoritatively remedied.

With the electronic reimbursement system, the analyst need no longer type in complicated entries from error-prone paper forms supplied by the customs broker. This electronic integration of the invoices with the applicable information in the TCS system reduces errors made during the process of human data entry, and speeds up the process of reimbursement for the benefit of the importer and customs broker alike.

Figure 29:
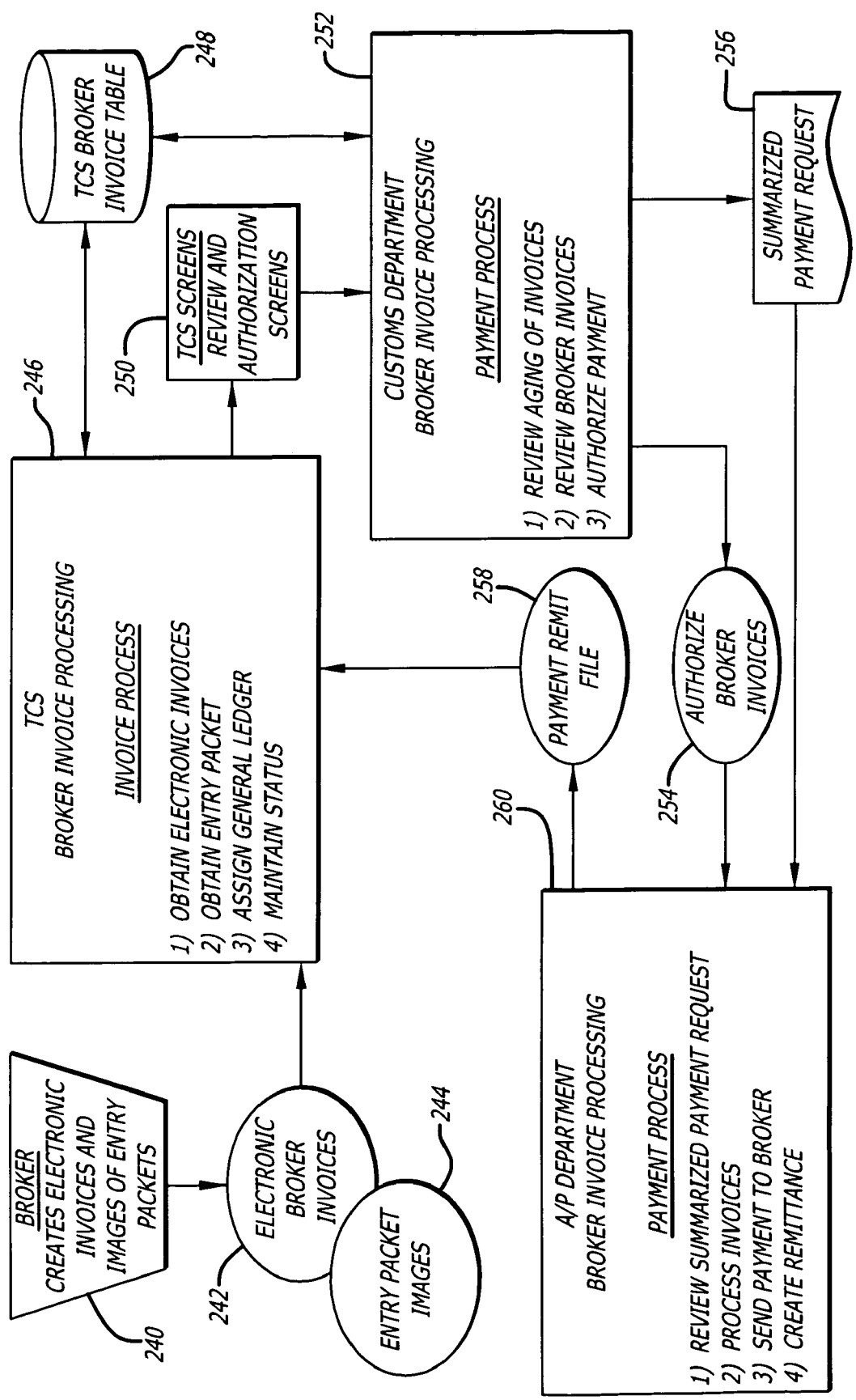
FIG. 29 is a flowchart showing a method for electronic reimbursement of a customs broker in accordance with an embodiment of the present disclosures.

FIG. 29 is a flow diagram of an exemplary TCS broker invoice reimbursement system in accordance with an embodiment of the present disclosures. At step 240, the broker creates electronic invoices 242 as well as the images of the related entry packets 244 as discussed in greater detail above. During the importer's TCS broker invoice process 246, the importer obtains the electronic invoices 242 from the broker. The importer also obtains the corresponding entry packet images 244 from the broker. Next, in the embodiment shown, the importer assigns a general ledger account number and cost center in order to identify and properly categorize the invoice and associated documentation. An analyst for the importer may also be designated to maintain various facets of the broker invoice status.

In performing the steps in 246, the importer uses the various applicable TCS screens 250 to navigate to the relevant documentation pertaining to the invoice. The importer may enter the invoice into a broker invoice table 248, and, using the methods discussed earlier herein, the importer may link the invoice to the entry packet information.

At the broker invoice processing step 252 of the importer's customs department, the various details associated with payment processing may be performed. The department may, for example, review the date or age of the invoices 254. The department may also compare the broker invoices with the information contained in the entry packet to ensure that the records are commensurate with one another. Once the accuracy of the invoices has been verified as accurate, the department may transmit a summarized payment request (step 256) to the accounts payable ("A/P") department for invoice processing.

In the accounts payable department according to the disclosed embodiment, an employee reviews the summarized payment request received from the customs department (step 260). The employee may also compare the request with its own summary of payments to ensure accuracy and that duplicative reimbursements are avoided. The employee may also process the electronic broker invoices through the company's weekly A/P payment cycle. Payment is then transmitted to the customs broker. Typically, the employee also creates remittance information for entry into the TCS to reflect the reimbursement and to "complete the picture" within the TCS.

The automated and step-by-step nature of the present method significantly streamlines and speeds up the process of providing broker reimbursement. It also helps reduce or eliminate unnecessary errors created in the course of human entry of data. Further, the information pertaining to reimbursement can be stored in the TCS and linked with other information concerning the shipments at issue. An analyst may thereafter peruse the database and glean all relevant information concerning a shipment, the items shipped, the documentation presented to U.S. Customs, any subsequent audits performed, and the reimbursement of the customs broker. The analyst has access to a number of user-friendly links through which he or she can navigate through the database to identify and isolate particular records of interest. The information can be subsequently reviewed or audited by other personnel with the appropriate permissions to access the TCS.

TCS Online Screen Navigation and Linkage

As discussed herein, the TCS in one embodiment includes an integrated web or other application suite that addresses customs and import-related issues including Classification, Quantity, Transaction Value Reported and Unreported, and Record Keeping, as well as specific compliance areas that meet specified standards for imported items. Such imported items may include, for example, service replacement parts, autos, motorcycles, power equipment, racing parts, etc.

As explained above in connection with FIG. 2, many of the on-line functions of the TCS application/database suite perform primary operational tasks essential for an effective U.S. Customs compliance system. These tasks may be categorized into four groups or phases of operation: 1) Pre-Entry (Classification); 2) Entry History; 3) Post-Entry (Audits and Payment Balancing); and 4) Amendments. The tasks within each phase of operation are designed in the TCS for process efficiency and user-friendliness, which in turn is accomplished through a complex yet integrated scheme of navigational linkages between functions and interrelated information. These navigational paths, discussed throughout the course of this disclosure, provide users with a unique process flow within the TCS application suite and provide the importer with a strategic business advantage over other methods of Trade Compliance operations. As noted at length above, documentation stored in the various repositories of the TCS is integrated through a series of related links such that functions and information that are relevant can be easily perused.

The navigational linkages may permit robust task flow within and across the TCS functions. No longer need records or copious paperwork be arbitrarily kept in various locations for an analyst to expend inordinate amounts of time processing. No longer need the importer constantly have to correct significant errors that otherwise could have been avoided through the streamlined and linked process flow available within the TCS and the integrated nature of its respective data repositories. No longer need various employees review records and separately make amendments, while not aware of or synchronized with the actions of each other. The navigational linkage system of the TCS provides each user with the ability to access a unified set of data with functions interlinked so that data amendments and audits can be readily identified and that information relevant to an importation can be quickly identified and scrutinized as necessary.

Integration of Phases of Importation Process

In addition, the TCS system of the present disclosures may provide a unique electronic linkage of the various phases of U.S. Customs compliance. The integrated nature of the various phases (classification, entry, post-entry, amendments) means that various records can be easily compared to one another even though the records may be associated with different phases of the importation process. A logical integration helps ensure consistency of information and minimizes the errors associated with incorrect tariffs paid and erroneous paperwork.

Figure 30:
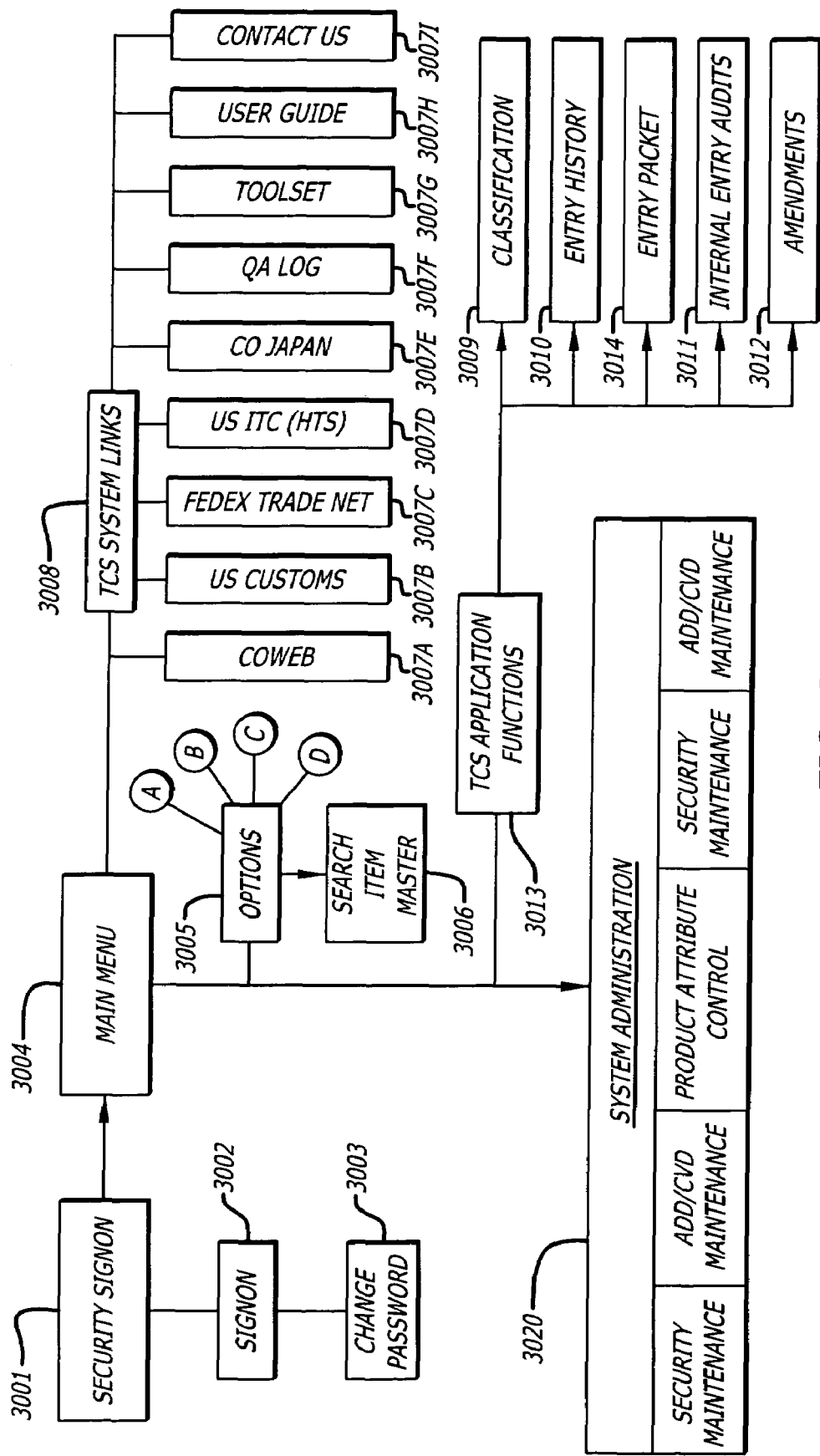
FIG. 30 is a flowchart showing an on-line navigation linkage system of the TCS in accordance with an embodiment of the present disclosures.

An illustration of the navigational capabilities of the TCS is set forth in FIG. 30. A user first logs on via a security login screen 3001 by providing a login name 3002 and a password 3003. After the user is validated, he or she is brought to a main screen 3004 similar to the main menu depicted in previous figures. The main menu in this embodiment may contain a variety of options 3005 and links. As an illustration, there may be a plurality of links, each relating to a particular phase of operation. Link set A may relate to pre-entry or classification functions. Link set B may pertain to entry functions. Link set C may provide access to post-entry functions such as auditing and payment balancing. Link set D may provide access to amendments. In other embodiments, the links are not per se categorized into these four classifications because actions taken may be common to different classifications. In still other embodiments, the navigational system may address only a subset of these four links. However, the navigational capabilities nonetheless enable the user to access all phases of operation in a user-friendly application screen. The user can also directly access and search the Item Master 3006 from the main menu 3004.

The main menu 3004 further provides a number of additional TCS System Links 3008. In this example, "Coweb" may bring the user to the company's intranet, which may include a suite of functions dedicated to importation and U.S. Customs processing. Link 3007B may take the user directly to a U.S. Customs web site, or other repository of U.S. Customs related information for use in classification and other purposes. Link 3007C provides in this embodiment a link to a customs broker, which in this instance is Fedex Trade Networks. A link 3007D to the web site of the United States International Trade Commission may be provided. A link 3007E to a corresponding division of the corporation in Japan may exist for, among other things, perusal by the analyst of the internal classifications of items. A Q/A log 3007F may also be obtained that may record questions and answers received from and provided to customs brokers and other third parties. A separate toolset link 3007G may provide the user with a plethora of other tools and links for navigating through the integrated data repository and finding information relating to a desired shipment, payment, audit, amendment, etc. A link 3007H to a user guide may conveniently enable the user to consult online help with respect to understanding various features or functions of the TCS. A link 3007H may also allow the user to contact U.S. Customs, or, depending on the implementation, another division of the corporation or similar entity.

In addition to the set of available links 3008, the analyst in this implementation may access from the main menu a variety of TCS application functions 3013. The specific functions available will depend on the specific implementation; however, functions relating to at least some of the four main phases of operations may be presented. The user may access Classification functions 3009, entry-related functions 3010, entry packet related functions 3014, Internal Entry Audits 3001 and post-entry Amendments 3012.

In addition, for those users with appropriate permissions, a System Administration menu 3020 may be provided that, in one embodiment, can be accessed directly from the main menu. In this example, the system administrator has control over attributes such as security maintenance, ADD/CVD maintenance, product attribute control, data transmission, and reference code maintenance. A comprehensive set of tools are therefore available on-line for the system administrator, who can make updates and generate changes as necessary while being logged into the system and without interfering with the independent search or data entry efforts of others.

The extensive and robust navigational capabilities of the TCS dramatically improve the Customs compliance and importation processes. While the principles described herein can apply to a TCS system suitable for any type or size of corporate or business entity or partnership, the teachings herein have significant utilities and advantages for large and diverse corporations, or for business entities that use a large number of different suppliers, vendors, or manufacturers. The maintenance of all pertinent data for U.S. Customs compliance in one streamlined database greatly reduces the efforts and ultimately the expenditures required by a company for maintaining accurate records and ensuring compliance with applicable customs rules and regulations. The navigational capabilities as shown in this disclosure further render efficient the internal process of tracking electronic documentation and making logical associations of certain document types for facilitating searches.

FIG. 31 is a screen illustrating the post-entry payment balancing capabilities of the TCS in accordance with an embodiment of the present disclosures. Screen 3102 of FIG. 31 is an exemplary page that may be displayed after the TCS computer performs a matching algorithm in which invoices and payment records are compared to identify matching sets. The matching algorithm may be performed, for example, when the user clicks on the Payment Balancing link 2005 in FIG. 20 described above. By comparing common attributes between each type of document (invoice and payment record), the TCS can automatically balance its records by pairing each invoice to its matching payment record. A matching algorithm may, for example, direct the computer to compare dates and dollar amounts between invoices and payment records in order to identify matches. After the matching algorithm is complete, unmatched invoices and unmatched payment records may be displayed side-by-side so that a user can manually inspect the records to identify matching sets.

In this embodiment, the TCS screen may contain a headline logo ("TCS—Payment Balancing") followed by dual list headings 3104. Beneath each of the list headings 3104 may be listed record information for each unmatched invoice and payment record. The computer may not have identified a match between invoice 3106 and payment record 3108 because the dates were not identical. In this example, invoice 3106 has a recorded date of Mar. 31, 2004 while payment record 3108 has a recorded date of Mar. 30, 2004, one day earlier. However, by visually comparing the dollar amounts of these two records once presented in a list format on display screen 3102, a user may recognize a potential match and investigate further. By clicking on either record in these lists, the user may access the pertinent documents for each entry in the TCS, and compare other attributes of each entry in order to manually determine whether they are indeed a match. If so, the user may identify them as a match to the system, thereby completing the balancing of these records. Likewise, the computer may not determine automatically that invoice 3110 and payment record 3112 constitute a match, since their dollar amounts are inconsistent. However, recognizing that the dollar amounts are close and that the dates are an exact match, the user may investigate further and determine that the two records are indeed a match, then continue the balancing process.

Upon manually identifying a match between records in each of the lists displayed on screen 3102, the user may access one of the records in the TCS and perform an edit to correct any incorrect data that may have resulted in the match being undetected by the system. For example, if invoice 3106 had an incorrect date, the user might have determined during the manual review process that the proper date was Mar. 30, 2004, consistent with payment record 3108. Thus, in addition to notifying the system that invoice 3106 and payment record 3108 constitute a match, the user may also initiate an edit to invoice 3106 in order to change the date to Mar. 30, 2004. The system may then optionally generate an amendment to document this change in accordance with U.S. Customs procedures.

While the present disclosures has been described herein as relating to a suite of web-based applications with appropriate software layering to database repositories (which may constitute hard drives, tape drives, etc.), the TCS need not necessarily be a web application and instead may use another user interface-based application suite integrated with the underlying data repositories. The TCS also need not be located in one particular region; instead, and depending on the implementation, a business entity may distribute the TCS functionality and available among a plurality of geographical areas.

The previous description of the disclosed embodiments is provided to enable any person skilled in the art to make or use embodiments of the present disclosures. Various modifications to these embodiments will be readily apparent to those skilled in the art, and the generic principles defined herein may be applied to other embodiments without departing from the spirit or scope of the teachings herein. Thus, the present disclosures are not intended to be limited to the embodiments shown herein but is to be accorded the widest scope consistent with the principles and novel features disclosed herein.

We claim:

1. A method used in connection with balancing payment records and invoices, comprising: receiving a plurality of invoices in a computer system, each invoice referring to a shipment;

receiving a plurality of payment records in the computer system, each payment record referring to a shipment;

identifying a plurality of unmatched invoices, each having no matching payment record in the plurality of payment records;

identifying a plurality of unmatched payment records, each having no matching invoice in the plurality of invoices;

generating a first list including the unmatched invoices and a second list including the unmatched payment records; and displaying the first and second lists together.

2. The method of claim 1 further comprising receiving input from a user representing a match between a invoice displayed in the first list and an payment record displayed in the second list.

3. The method of claim 2 farther comprising receiving an additional input from the user representing a correction to at least one of the payment record displayed in the first list and the invoice displayed in the second list and, in response to receiving the addition input, editing at least one of the payment record and the invoice to reflect the correction.

4. The method of claim 3 further comprising an emendment report including information about the edit.

5. Computer-readable media embodying a program of instructions executable by a computer to perform a method used in connection with balancing invoice and payment records, the method comprising:

receiving a plurality of invoices in a computer system, each invoice referring to a shipment;

receiving a plurality of payment records in the computer system, each payment record referring to a shipment;

identifying a plurality of unmatched invoices, each having no matching payment record in the plurality of payment records;

identifying a plurality of unmatched payment records, each having no matching invoice in the plurality of invoices;

generating a first list including the unmatched invoices and a second list including the unmatched payment records; and displaying the first and second lists together.

6. A system for balancing invoice and payment records comprising:

an input configured to receive a plurality of invoices and a plurality of payment records, each invoice referring to a shipment and each payment record referring to a shipment;

a processor configured to identify a plurality of unmatched invoices each having no matching payment record in the plurality of payment records, identify a plurality of unmatched payment records each having no matching invoice in the plurality of invoices, and generate a first list including the unmatched invoices and a second list including the unmatched payment records; and a display device configured to display the first and second lists together.

\* \* \* \* \*

UNITED STATES PATENT AND TRADEMARK OFFICE
CERTIFICATE OF CORRECTION

| | | |
|---|---|---|
| PATENT NO. | : 7,389,286 B2 | Page 1 of 2 |
| APPLICATION NO. | : 11/039003 | |
| DATED | : June 17, 2008 | |
| INVENTOR(S) | : Frederic Holmes et al. | |

It is certified that error appears in the above-identified patent and that said Letters Patent is hereby corrected as shown below:

Claims 1, 5 and 6 should appear as follows:

Col. 39, line 6,
1. A method used in connection with balancing payment records and invoices, comprising:
    receiving a plurality of invoices in a computer system, each invoice referring to a shipment;
    receiving a plurality of payment records in the computer system, each payment record referring to a shipment;
    "performing a matching algorithm by a Trade Compliance System in response to a request to perform the matching algorithm, that compares corresponding types of information in the invoices and the payment records, including dates and dollar amounts;
    based on the comparison, automatically balancing records by pairing each of a plurality of the invoices with a matching payment record;
    based on the comparison, "identifying a plurality of unmatched invoices, each having no matching payment record in the plurality of payment records;" and
    based on the comparison, "identifying a plurality of unmatched payment records, each having no matching invoice in the plurality of invoices;
    "after the matching algorithm is complete," generating a first list including the unmatched invoices and a second list including the unmatched payment records; --and--
    displaying the first and second lists together--.-- ";"
    "inspecting the displayed lists; and
    identifying further matching sets of invoices and payment records based on similarities between one or more types of information in the invoices and the payment" records, including dates and dollar amounts.

Col. 39, line 34,
5. Computer-readable media embodying a program of instructions executable by a computer to perform a method used in connection with balancing invoice and payment records, the method comprising:
    receiving a plurality of invoices in a computer system, each invoice referring to a shipment; receiving a plurality of payment records in the computer system, each payment record referring to a shipment;

Signed and Sealed this

First Day of June, 2010

David J. Kappos
*Director of the United States Patent and Trademark Office*

"performing a matching algorithm by a Trade Compliance System in response to a request to perform the matching algorithm, that compares corresponding types of information in the invoices and the payment records, including dates and dollar amounts;
    based on the comparison, automatically balancing records by pairing each of a plurality of the invoices with a matching payment record;
    "based on the comparison," identifying a plurality of unmatched invoices, each having no matching payment record in the plurality of payment records;" and
    "based on the comparison," identifying a plurality of unmatched payment records, each having no matching invoice in the plurality of invoices;
    "after the matching algorithm is complete," generating a first list including the unmatched invoices and a second list including the unmatched payment records; and displaying the first and second lists together.

Col. 40, line 17,
  6. A system for balancing invoice and payment records comprising:
    an input configured to receive a plurality of invoices and a plurality of payment records, each invoice referring to a shipment and each payment record referring to a shipment;
    a processor configured to:
    "perform a matching algorithm by a Trade Compliance System in response to a request to perform the matching algorithm, that compares corresponding types of information in the invoices and the payment records, including dates and dollar amounts;"
    based on the comparison, automatically balances records by pairing each "of a plurality of the invoices with a matching payment record;
    "based on the comparison, identifies" --identify-- a plurality of unmatched invoices each having no matching payment record in the plurality of payment records,
    "based on the comparison, identifies" --identify-- a plurality of unmatched payment records each having no matching invoice in the plurality of invoices,
    "after the matching algorithm is complete," generate a first list including the unmatched invoices and a second list including the unmatched payment records; and
    a display device configured to display the first and second lists together.

UNITED STATES PATENT AND TRADEMARK OFFICE
CERTIFICATE OF CORRECTION

PATENT NO.       : 7,389,286 B2                                                                    Page 1 of 2
APPLICATION NO.  : 11/039003
DATED            : June 17, 2008
INVENTOR(S)      : Frederic Holmes et al.

It is certified that error appears in the above-identified patent and that said Letters Patent is hereby corrected as shown below:

Claims 1, 5 and 6 should appear as follows:

Col. 39, line 6,
    1. A method used in connection with balancing payment records and invoices, comprising:
      receiving a plurality of invoices in a computer system, each invoice referring to a shipment;
      receiving a plurality of payment records in the computer system, each payment record referring to a shipment;
      "performing a matching algorithm by a Trade Compliance System in response to a request to perform the matching algorithm, that compares corresponding types of information in the invoices and the payment records, including dates and dollar amounts;
      based on the comparison, automatically balancing records by pairing each of a plurality of the invoices with a matching payment record;
      based on the comparison," identifying a plurality of unmatched invoices, each having no matching payment record in the plurality of payment records; "and
      based on the comparison," identifying a plurality of unmatched payment records, each having no matching invoice in the plurality of invoices;
      "after the matching algorithm is complete," generating a first list including the unmatched invoices and a second list including the unmatched payment records; --and--
      displaying the first and second lists together--.-- ";"
      "inspecting the displayed lists; and
      identifying further matching sets of invoices and payment records based on similarities between one or more types of information in the invoices and the payment" records, including dates and dollar amounts.

Col. 39, line 34,
    5. Computer-readable media embodying a program of instructions executable by a computer to perform a method used in connection with balancing invoice and payment records, the method comprising:

This certificate supersedes the Certificate of Correction issued June 1, 2010.

Signed and Sealed this

Fourteenth Day of September, 2010

David J. Kappos
*Director of the United States Patent and Trademark Office* receiving a plurality of invoices in a computer system, each invoice referring to a shipment; receiving a plurality of payment records in the computer system, each payment record referring to a shipment;

"performing a matching algorithm by a Trade Compliance System in response to a request to perform the matching algorithm, that compares corresponding types of information in the invoices and the payment records, including dates and dollar amounts;

based on the comparison, automatically balancing records by pairing each of a plurality of the invoices with a matching payment record;

based on the comparison," identifying a plurality of unmatched invoices, each having no matching payment record in the plurality of payment records; "and based on the comparison," identifying a plurality of unmatched payment records, each having no matching invoice in the plurality of invoices;

"after the matching algorithm is complete," generating a first list including the unmatched invoices and a second list including the unmatched payment records; and displaying the first and second lists together.

Col. 40, line 17,

6. A system for balancing invoice and payment records comprising:

an input configured to receive a plurality of invoices and a plurality of payment records, each invoice referring to a shipment and each payment record referring to a shipment;

a processor configured to:

"perform a matching algorithm by a Trade Compliance System in response to a request to perform the matching algorithm, that compares corresponding types of information in the invoices and the payment records, including dates and dollar amounts;"

based on the comparison, automatically balances records by pairing each "of a plurality of the invoices with a matching payment record;

based on the comparison, identifies" --identify-- a plurality of unmatched invoices each having no matching payment record in the plurality of payment records, "based on the comparison, identifies" --identify-- a plurality of unmatched payment records each having no matching invoice in the plurality of invoices, "after the matching algorithm is complete," generate a first list including the unmatched invoices and a second list including the unmatched payment records; and a display device configured to display the first and second lists together.